US009532410B2

(12) United States Patent
Verfuerth et al.

(10) Patent No.: US 9,532,410 B2
(45) Date of Patent: *Dec. 27, 2016

(54) MODULAR LIGHT FIXTURE WITH POWER PACK

(71) Applicant: Orion Energy Systems, Inc., Manitowoc, WI (US)

(72) Inventors: Neal R. Verfuerth, Plymouth, WI (US); Ronald E. Ernst, Waldo, WI (US); Kenneth J. Wetenkamp, Plymouth, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/483,968

(22) Filed: Sep. 11, 2014

(65) Prior Publication Data

US 2015/0028770 A1 Jan. 29, 2015

Related U.S. Application Data

(63) Continuation of application No. 13/722,889, filed on Dec. 20, 2012, now Pat. No. 8,858,018, which is a
(Continued)

(51) Int. Cl.
*F21S 4/00* (2016.01)
*H05B 33/08* (2006.01)
(Continued)

(52) U.S. Cl.
CPC ............. *H05B 33/0803* (2013.01); *F21K 9/17* (2013.01); *F21V 5/04* (2013.01); *F21V 7/005* (2013.01);
(Continued)

(58) Field of Classification Search
CPC ......... F21S 2/005; F21V 23/026; F21V 23/06; F21V 29/22; F21W 2131/40
See application file for complete search history.

(56) References Cited

U.S. PATENT DOCUMENTS

| 1,918,126 A | 7/1933 | Peterson |
| D119,800 S | 4/1940 | Carter, Jr. |

(Continued)

OTHER PUBLICATIONS

Day-Brite 4' or 8' Assembly Line Light Luminaire Brochure, published 2000, 2 pages.
(Continued)

*Primary Examiner* — Andrew Coughlin
*Assistant Examiner* — Meghan Ulanday
(74) *Attorney, Agent, or Firm* — Foley & Lardner LLP

(57) ABSTRACT

A light fixture including a support structure and a plurality of LEDs coupled to the structure and spaced apart along at least a portion of a length of the structure. The light fixture further includes a power pack, the power pack including a driver configured to be electrically coupled to the plurality of LEDs, power input wiring that is configured to receive power for the light fixture, and a cover provided substantially over the driver and the power input wiring. A modular power input connector is accessible without removing the cover, wherein the modular power input connector is coupled to the power input wiring, and wherein the modular power input connector is configured to accept a power cord.

20 Claims, 24 Drawing Sheets

Related U.S. Application Data continuation-in-part of application No. 13/424,056, filed on Mar. 19, 2012, now Pat. No. 8,337,043, which is a continuation of application No. 12/345,443, filed on Dec. 29, 2008, now Pat. No. 8,136,958, which is a continuation-in-part of application No. 11/242,620, filed on Oct. 3, 2005, now Pat. No. 7,575,338.

(51) Int. Cl.

| | |
|---|---|
| *F21K 99/00* | (2016.01) |
| *F21V 15/01* | (2006.01) |
| *F21V 23/02* | (2006.01) |
| *F21V 23/06* | (2006.01) |
| *F21V 29/00* | (2015.01) |
| *F21V 5/04* | (2006.01) |
| *F21V 7/00* | (2006.01) |
| *F21V 9/08* | (2006.01) |
| *F21V 23/00* | (2015.01) |
| *F21V 29/70* | (2015.01) |
| *F21W 131/40* | (2006.01) |
| *F21Y 103/00* | (2016.01) |
| *H01R 13/64* | (2006.01) |
| *F21V 31/03* | (2006.01) |
| *F21V 33/00* | (2006.01) |
| *F21S 2/00* | (2016.01) |
| *F21S 8/06* | (2006.01) |
| *F21V 23/04* | (2006.01) |
| *F21Y 113/00* | (2016.01) |
| *F21V 29/83* | (2015.01) |

(52) U.S. Cl.
CPC ............... *F21V 9/08* (2013.01); *F21V 15/01* (2013.01); *F21V 23/009* (2013.01); *F21V 23/026* (2013.01); *F21V 23/06* (2013.01); *F21V 29/004* (2013.01); *F21V 29/70* (2015.01); *F21S 2/005* (2013.01); *F21S 8/061* (2013.01); *F21V 23/0464* (2013.01); *F21V 23/0471* (2013.01); *F21V 29/83* (2015.01); *F21V 31/03* (2013.01); *F21V 33/0052* (2013.01); *F21V 33/0056* (2013.01); *F21V 33/0076* (2013.01); *F21W 2131/40* (2013.01); *F21Y 2103/00* (2013.01); *F21Y 2103/003* (2013.01); *F21Y 2113/00* (2013.01); *H01R 13/64* (2013.01); *Y10T 29/49204* (2015.01)

(56) References Cited

U.S. PATENT DOCUMENTS

| | | |
|---|---|---|
| D122,887 S | 10/1940 | Geals |
| 2,306,206 A | 12/1942 | Dalgleish |
| 2,312,617 A | 3/1943 | Beck |
| D142,126 S | 8/1945 | Sabatini |
| 2,403,240 A | 7/1946 | Sawin |
| D147,812 S | 11/1947 | Picker |
| D150,735 S | 8/1948 | Schwartz et al. |
| 2,619,583 A | 11/1952 | Baumgartner |
| 2,636,977 A | 4/1953 | Foster |
| 2,748,359 A | 5/1956 | Swan |
| 3,247,368 A | 4/1966 | McHugh |
| 3,337,035 A | 8/1967 | Pennybacker |
| 3,390,371 A | 6/1968 | Kramer |
| D217,615 S | 5/1970 | Kress |
| 3,571,781 A | 3/1971 | Gartland et al. |
| 3,860,829 A | 1/1975 | Fabbri |
| 4,001,571 A | 1/1977 | Martin |
| 4,144,462 A | 3/1979 | Sieron et al. |
| 4,146,287 A | 3/1979 | Jonsson |
| 4,169,648 A | 10/1979 | Moist, Jr. |
| 4,238,815 A | 12/1980 | Price |
| D263,699 S | 4/1982 | Vest et al. |
| 4,363,082 A | 12/1982 | Roland |
| 4,387,417 A | 6/1983 | Plemmons et al. |
| 4,435,744 A | 3/1984 | Russo |
| 4,443,048 A | 4/1984 | Moist, Jr. |
| 4,544,220 A | 10/1985 | Aiello et al. |
| 4,674,015 A | 6/1987 | Smith |
| 4,690,476 A | 9/1987 | Morgenrath |
| 4,701,698 A | 10/1987 | Karlsson et al. |
| 4,708,662 A | 11/1987 | Klein |
| 4,726,780 A | 2/1988 | Thackeray |
| 4,749,941 A | 6/1988 | Halder et al. |
| 4,814,954 A | 3/1989 | Spitz |
| 4,834,673 A | 5/1989 | Beinhaur et al. |
| 4,904,195 A | 2/1990 | Thackeray |
| 4,907,985 A | 3/1990 | Johnsen |
| 4,928,209 A | 5/1990 | Rodin |
| 4,933,633 A | 6/1990 | Allgood |
| D311,900 S | 11/1990 | Esslinger |
| 5,013,253 A | 5/1991 | Aiello et al. |
| 5,037,325 A | 8/1991 | Wirkus |
| 5,062,030 A | 10/1991 | Figueroa |
| 5,069,634 A | 12/1991 | Chiarolanzio |
| 5,111,370 A | 5/1992 | Clark |
| D329,919 S | 9/1992 | Jahn |
| 5,192,129 A | 3/1993 | Figueroa |
| 5,274,533 A | 12/1993 | Neary et al. |
| 5,315,236 A | 5/1994 | Lee |
| 5,320,560 A | 6/1994 | Fladung |
| 5,342,221 A | 8/1994 | Peterson |
| 5,349,289 A | 9/1994 | Shirai |
| 5,357,170 A | 10/1994 | Luchaco et al. |
| 5,371,661 A | 12/1994 | Simpson |
| 5,377,075 A | 12/1994 | Schmid et al. |
| 5,395,264 A | 3/1995 | Keith |
| 5,462,452 A | 10/1995 | Devine |
| D364,478 S | 11/1995 | Pesau |
| D365,409 S | 12/1995 | Lu |
| 5,473,522 A | 12/1995 | Kriz et al. |
| 5,489,827 A | 2/1996 | Xia |
| 5,616,042 A | 4/1997 | Raby et al. |
| D381,629 S | 7/1997 | Goto |
| 5,673,022 A | 9/1997 | Patel |
| 5,676,563 A | 10/1997 | Kondo et al. |
| 5,727,871 A | 3/1998 | Kotloff |
| 5,743,627 A | 4/1998 | Casteel |
| D395,727 S | 6/1998 | Thorton, Jr. |
| D399,019 S | 9/1998 | Wilmotte |
| D402,763 S | 12/1998 | Bring |
| 5,855,494 A | 1/1999 | Blaszczyk et al. |
| 5,907,197 A | 5/1999 | Faulk |
| 5,961,207 A | 10/1999 | Petkovic |
| D416,542 S | 11/1999 | Tsai |
| 6,024,594 A | 2/2000 | Self et al. |
| D425,860 S | 5/2000 | Goto |
| 6,059,424 A | 5/2000 | Kotloff |
| 6,091,200 A | 7/2000 | Lenz |
| 6,102,550 A | 8/2000 | Edwards, Jr. |
| D434,167 S | 11/2000 | Foster |
| 6,151,529 A | 11/2000 | Batko |
| 6,210,019 B1 | 4/2001 | Weathers |
| D447,266 S | 8/2001 | Verfuerth |
| D447,736 S | 9/2001 | Nakashima et al. |
| 6,291,770 B1 | 9/2001 | Casperson |
| 6,328,597 B1 | 12/2001 | Epps |
| D460,735 S | 7/2002 | Verfuerth |
| 6,420,839 B1 | 7/2002 | Chiang et al. |
| D463,059 S | 9/2002 | Verfuerth |
| D466,867 S | 12/2002 | Krobusek |
| 6,496,756 B1 | 12/2002 | Nishizawa et al. |
| 6,540,549 B2 | 4/2003 | Rupert |
| 6,585,396 B1 | 7/2003 | Verfuerth |
| D479,826 S | 9/2003 | Verfuerth et al. |
| 6,644,836 B1 | 11/2003 | Adams |
| D483,332 S | 12/2003 | Verfuerth |
| 6,710,588 B1 | 3/2004 | Verfuerth et al. |
| 6,724,180 B1 | 4/2004 | Verfuerth et al. |
| 6,746,274 B1 | 6/2004 | Verfuerth |

(56) References Cited

U.S. PATENT DOCUMENTS

| | | |
|---|---|---|
| 6,758,580 B1 | 7/2004 | Verfuerth |
| 6,774,619 B1 | 8/2004 | Verfuerth et al. |
| 6,979,097 B2 | 12/2005 | Elam et al. |
| 7,282,840 B2 | 10/2007 | Chih |
| 7,575,338 B1 | 8/2009 | Verfuerth |
| 7,726,840 B2 | 6/2010 | Pearson et al. |
| 8,136,958 B2 | 3/2012 | Verfuerth et al. |
| 8,858,018 B2 * | 10/2014 | Verfuerth ................ F21S 4/003 362/148 |
| 2002/0172049 A1 | 11/2002 | Yueh |
| 2002/0189841 A1 | 12/2002 | Patterson |
| 2003/0179577 A1 | 9/2003 | Marsh |
| 2004/0076001 A1 | 4/2004 | Lutes |
| 2005/0201088 A1 | 9/2005 | Stach et al. |
| 2006/0232959 A1 | 10/2006 | Hutchinson et al. |
| 2008/0007943 A1 | 1/2008 | Verfuerth et al. |
| 2008/0007944 A1 | 1/2008 | Verfuerth et al. |
| 2009/0034263 A1 | 2/2009 | Stenback et al. |

OTHER PUBLICATIONS

Day-Brite Assembly Line Light Fixture Webpage, available at least by Apr. 19, 2005, 1 page.
Electrical Eng. Handbook: 14th Edition; McGraw Hill Pub. ISBN #0070220050; published 1999, Editor Fink, et al., pp. 26-57.
Hubble Lighting Hazardous Locations Fluorescent Brochure, published 1994, 3 pages.
Los Angeles Lighting Mfg. Co. Open Commercial, Ladder Arm Strip Brochure, published no later than 2000, 3 pages.
Los Angeles Lighting Mfg. Co. Open Commercial, Ladder Arm Strip Webpage, published 1998, 1 page.
Photos of Hubble Lighting Hazardous Locations Fluourescent Fixture, 5 pages.

\* cited by examiner

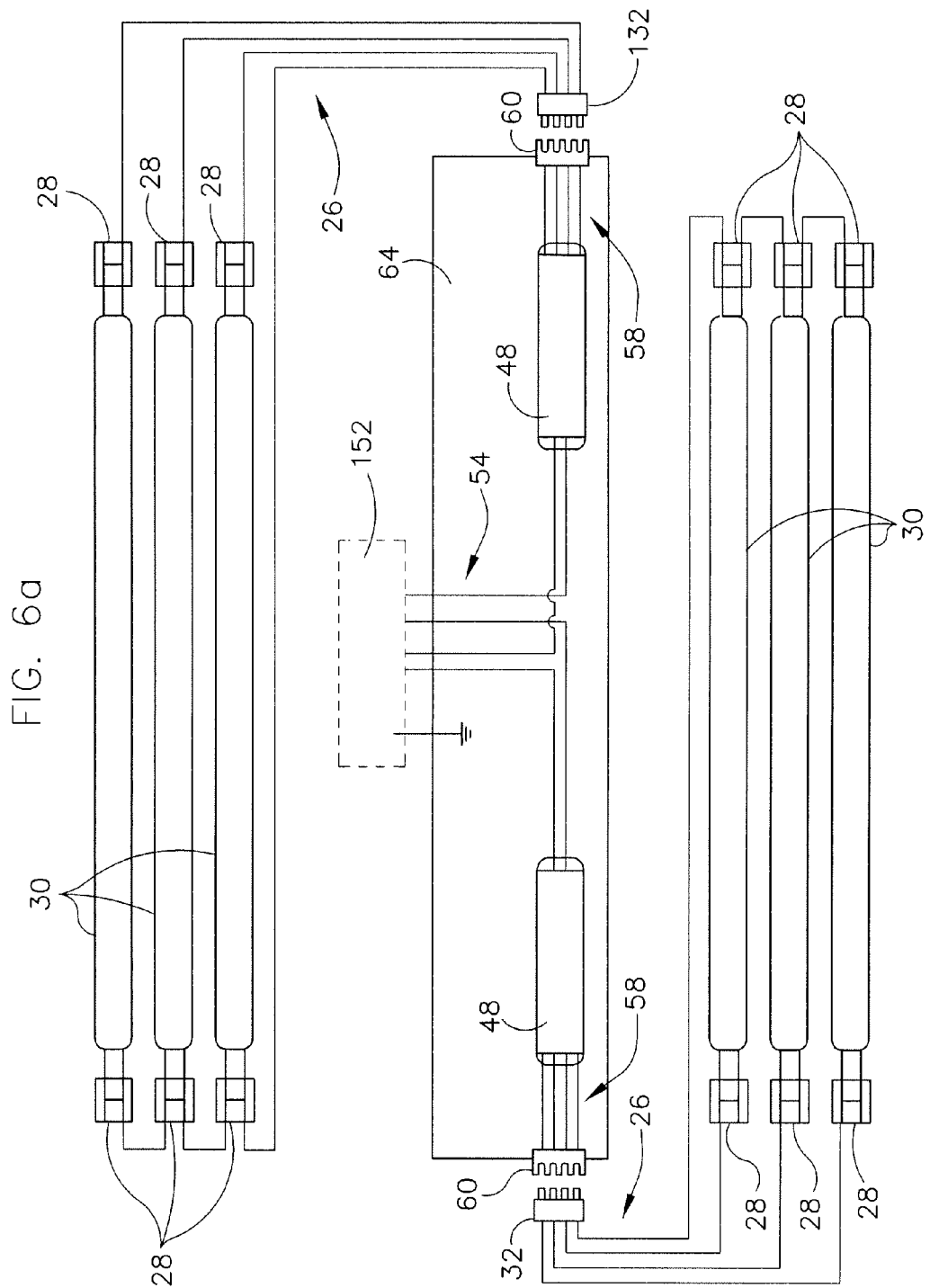

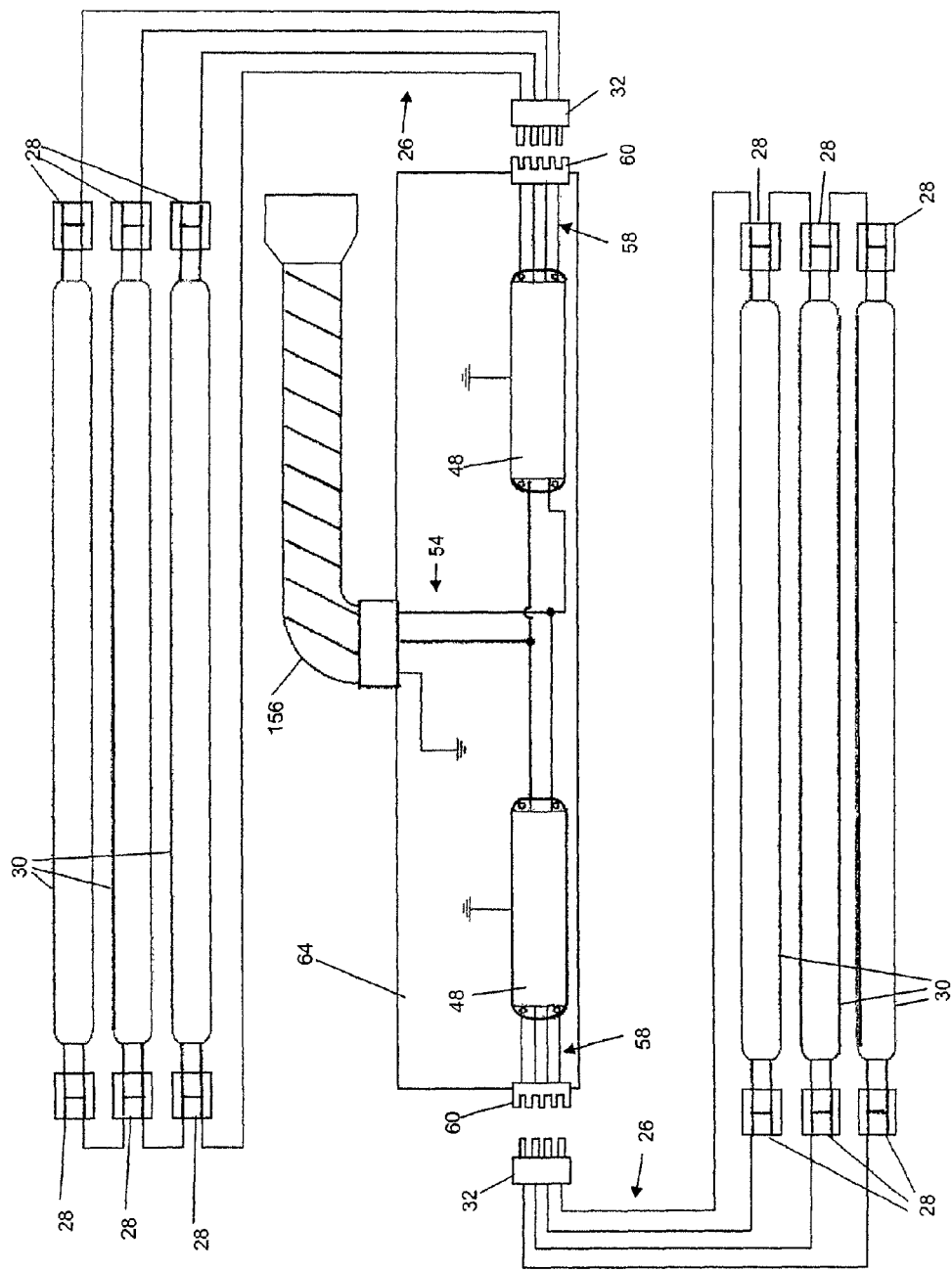

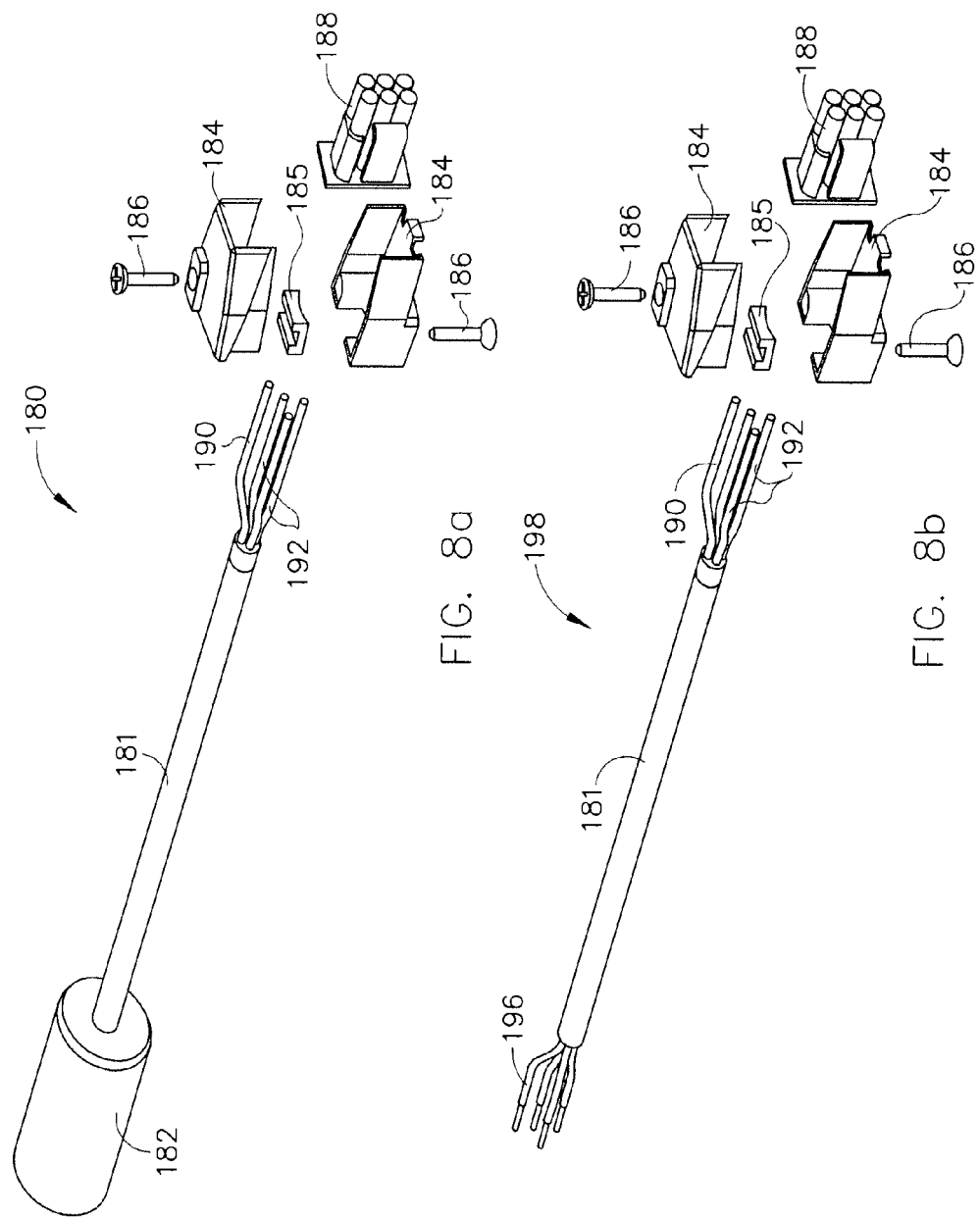

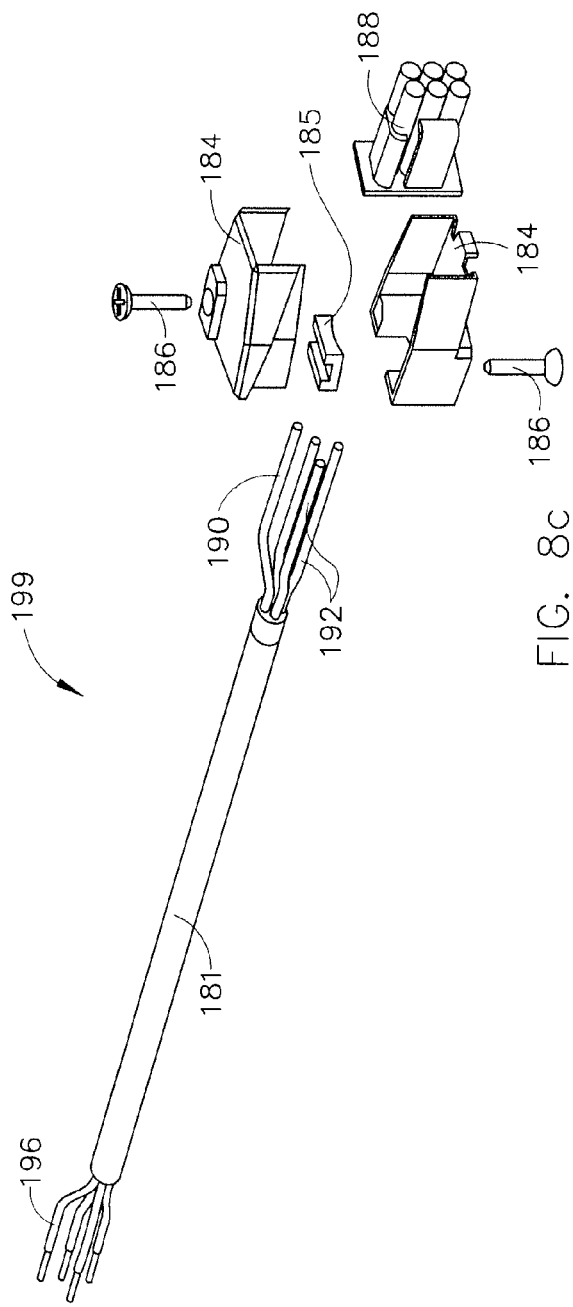
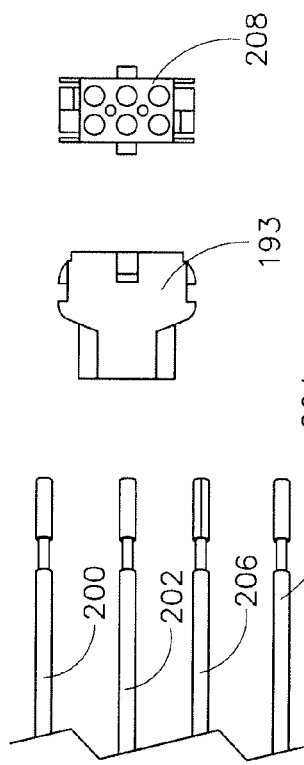
FIG. 8c
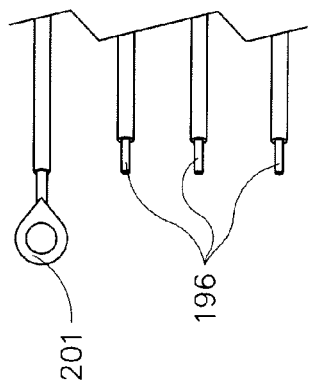
FIG. 9

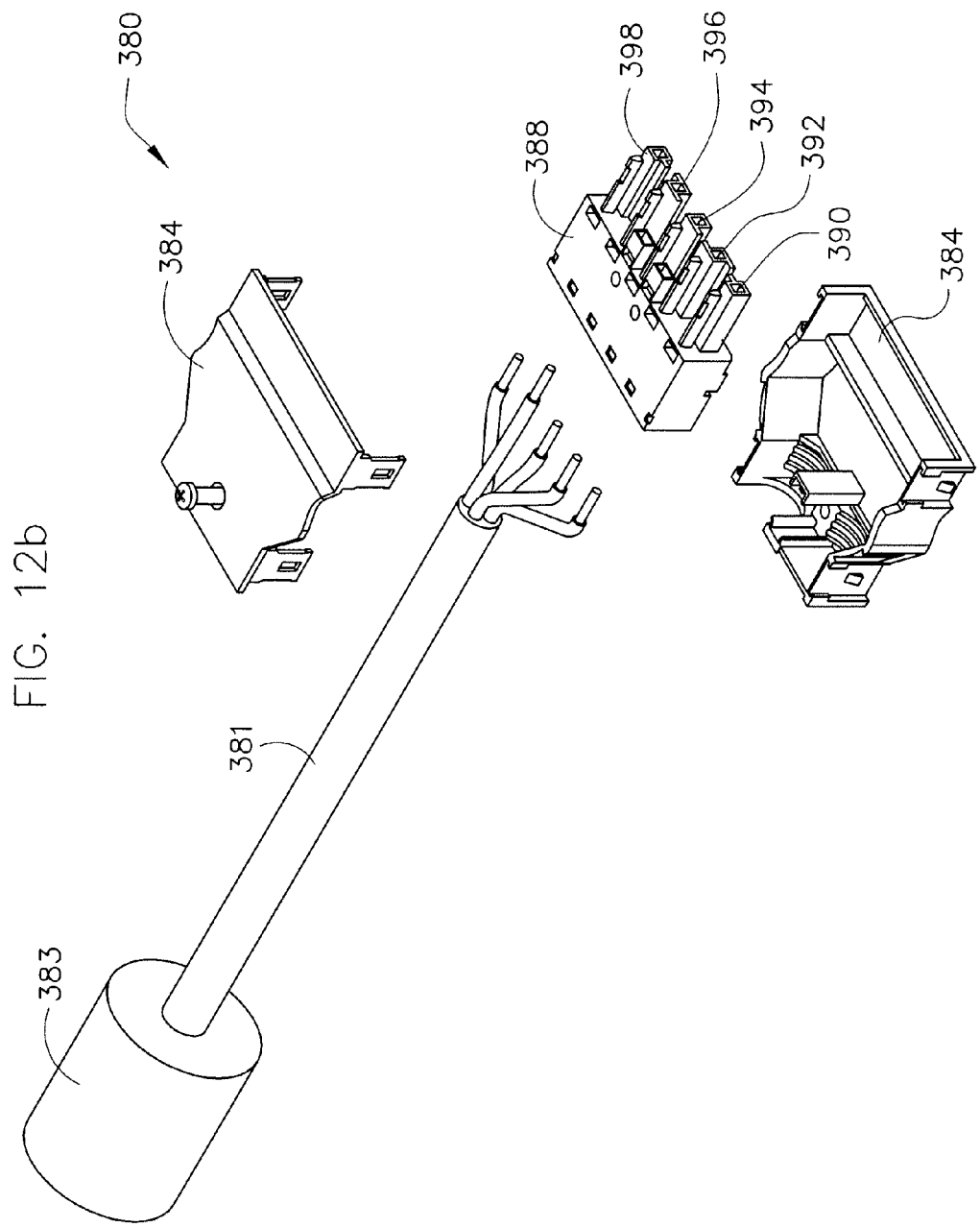

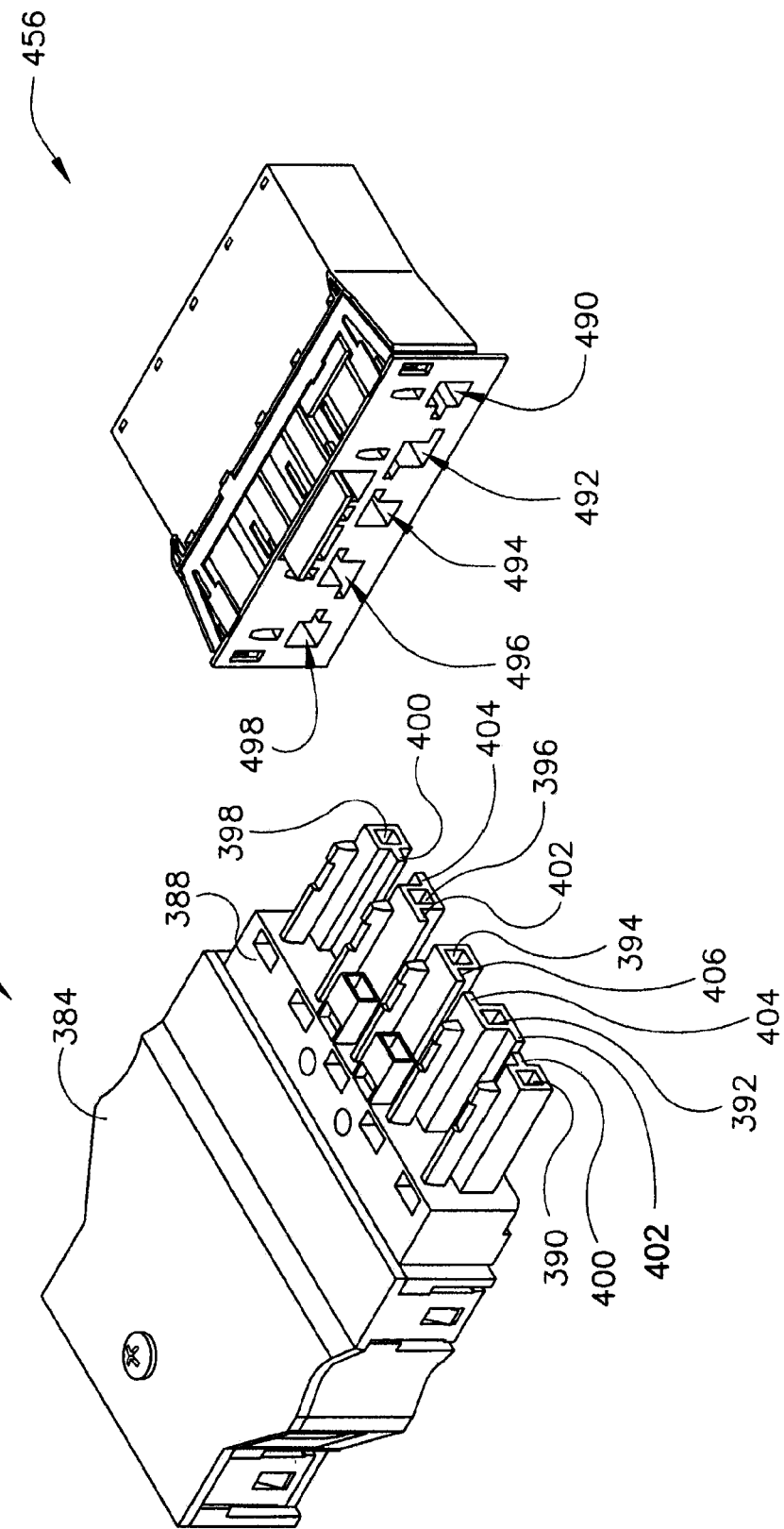

MODULAR LIGHT FIXTURE WITH POWER PACK

CROSS-REFERENCE TO RELATED APPLICATIONS

The present application is a Continuation of U.S. patent application Ser. No. 13/722,889, filed Dec. 20, 2012, which is a Continuation-in-Part of U.S. patent application Ser. No. 13/424,056, filed Mar. 19, 2012 (now U.S. Pat. No. 8,337,043), which is a Continuation of U.S. patent application Ser. No. 12/345,443, filed Dec. 29, 2008 (now U.S. Pat. No. 8,136,958), which is a Continuation-in-Part of U.S. patent application Ser. No. 11/242,620, filed Oct. 3, 2005 (now U.S. Pat. No. 7,575,338). The entire disclosures of U.S. patent application Ser. No. 13/722,889, U.S. patent application Ser. No. 13/424,056, U.S. patent application Ser. No. 12/345,443, and U.S. patent application Ser. No. 11/242,620 are incorporated herein by reference.

FIELD

The present application relates generally to energy management and utilization in large commercial buildings, and more particularly to a modular light fixture apparatus and method therefor.

BACKGROUND

In large commercial buildings, recurring electricity costs for lighting can be more than half of the total energy budget. Consequently, there are considerable economic benefits to be obtained through more efficient lighting techniques. For example, simple devices such as motion sensor switches or light timers are often used to reduce wasted energy by reducing unnecessary lighting.

Long term energy and lighting management in large commercial lighting applications presents greater challenges. Lighting requirements in different areas of a store or manufacturing plant may change as departments move or reorganize. Lighting technologies change over time, delivering improved performance and efficiency. Thus, it may become necessary or desirable to replace obsolete lighting technology with newer technology, or to relocate, enhance, or maintain existing lighting fixtures. Especially as energy costs continue to rise, many existing commercial buildings will eventually consider some form of lighting retrofit or redeployment.

Existing commercial buildings vary widely in age, construction, and intended use, so the available electric power sources may have any of several different voltage levels, and access to that power may be provided using a variety of electrical connection types. Support and mounting techniques will vary. Further, lighting requirements, such as light level, spectrum, and timing, are as diverse as the range of intended uses.

Many large commercial lighting applications depend heavily on fluorescent light fixtures driven by a ballast. The type of ballast determines, for example, the power consumption and optimal type of lamp to be used in the fixture. Along with characteristics of the light fixture itself, such as the geometry of the fixture, heat management, and the shapes of the reflectors, the choice of ballast and lamp largely determine the gross light production, expected maintenance interval, and energy consumption of the fixture. Consequently, effective lighting redeployment may require changing the ballast and/or type of lamp used in the fixture.

Light fixtures having enhanced features are familiar to consumers. For example, light fixtures can include photodetectors or motion detectors. A light fixture can be continuously dimmable, or it may include two or more separately controllable light circuits for lighting that can be completely off, partially on, or fully on. A lighting redeployment may introduce or change the use of such enhanced features to help conserve electrical power.

In a typical prior art light fixture, the ballast and any enhanced features are usually hard wired inside the fixture, and the fixture is hard-wired to building power. So, except for changing the lamp, changes to a typical prior art light fixture may often require services of a relatively highly skilled worker, such as an electrician, and/or replacement of the entire fixture.

Thus, it can be costly to remove and replace existing light fixtures, or even to reposition existing light fixtures. It can also be costly to modify or enhance existing light fixtures with different ballast technology or enhanced features to improve their effectiveness or efficiency. Because of these economic barriers, existing light fixtures tend to remain in place even when they are obsolete or lighting requirements change, resulting in wasted electrical power and lost productivity due to ineffective lighting.

Thus, what is needed is a modular light fixture architecture specially adapted for flexible, cost-effective, and safe retrofit to existing commercial buildings. What is further needed is a modular light fixture architecture specially adapted for flexible, cost-effective, and safe long term maintenance and redeployment in response to changing lighting requirements and improvements in technology.

SUMMARY

According to an exemplary embodiment, a light fixture includes a support structure and a plurality of light emitting diodes (LEDs) coupled to the support structure. The LEDs are spaced apart along at least a portion of the support structure. The light fixture further includes a power pack, wherein the power pack includes a driver configured to be electrically coupled to the plurality of LEDs, power input wiring that is configured to receive power for the light fixture, and a cover provided substantially over the driver and the power input wiring. The light fixture further includes a modular power input connector, wherein the modular power input connector is configured to allow a power cord to supply power to the light fixture without removing the cover.

According to another exemplary embodiment, a method includes providing a preassembled light fixture, wherein the light fixture includes a power pack, a cover provided over the power pack, and a power input connector coupled to the cover. The power input connector is configured to receive power from a power source and to direct power to the power pack. The power input connector is also configured to be coupled to the power source without removing the cover from the light fixture. The method further includes connecting the power input connector to a power supply line electrically coupled to the power source without removing the cover. The light fixture comprises a plurality of light emitting diodes that receive power from the power pack, and the power pack includes at least one driver for controlling the plurality of light emitting diodes.

According to another exemplary embodiment, a light fixture includes a first raceway at a first end of the light fixture and a second raceway at a second opposing end of the light fixture. At least one reflector extends between and secured to the first and second raceways. A first lampholder is coupled to the first raceway and a second lampholder coupled to the second raceway, wherein the first and second lampholders are configured to hold a fluorescent tube adjacent a first side of the at least one reflector. A power pack is provided adjacent a second side of the at least one reflector opposite the first side, wherein the power pack includes at least one ballast, power input wiring that is configured to receive power for the light fixture, and ballast output wiring that is configured to be electrically coupled to the first and second lampholders. A cover is provided over the at least one ballast, the ballast output wiring, and the power input wiring, wherein the cover is coupled to the first and second raceways and has a modular power input connector coupled thereto that is configured to allow a power cord to supply power to the light fixture without removing the cover.

According to another exemplary embodiment, a light fixture includes a first raceway disposed at a first end of the light fixture, a second raceway disposed at a second end of the light fixture, and a detachable cover that is removably coupled to the first raceway and to the second raceway. A ballast and power input wiring are coupled to the detachable cover, and an elongated lamp electrically coupled to the ballast. The light fixture also includes a power input connector that includes a socket portion and a plug portion, one of the socket portion and the plug portion coupled to the detachable cover and electrically connected to the power input wiring, and the other of the socket portion and the plug portion connectible to a power supply line to provide electrical power to the light fixture from a power source.

According to another exemplary embodiment, a method includes providing a preassembled light fixture, wherein the light fixture comprises a first raceway and a second raceway configured to have a power pack extending at least partially between the first and second raceway, a detachable cover provided over the power pack and extending between the first and second raceways, and a power input connector coupled to the detachable cover and configured to receive power from a power source and to direct power to the power pack, the power input connector configured to be coupled to the power source without removing the detachable cover from the light fixture. The method further comprises connecting the power input connector to a power supply line electrically coupled to the power source without removing the detachable cover.

BRIEF DESCRIPTION OF THE DRAWINGS

FIGS. 8(*a*)-8(*c*) are perspective views of exemplary modular power supply cords for use according to the invention.

FIG. 9 presents plan views of the components of exemplary power input wiring for use according to the invention.

FIG. 13(*a*) is a detailed perspective view of the connector for a modular power supply cord according to the embodiment shown in FIGS. 12(*a*) and 12(*b*).

FIG. 13(*b*) is a detailed perspective view of a power input connector for use with the connector for a modular power supply cord according to the embodiment shown in FIGS. 12(*a*)-12(*b*), and FIG. 13(*a*).

DETAILED DESCRIPTION

Figure 1:
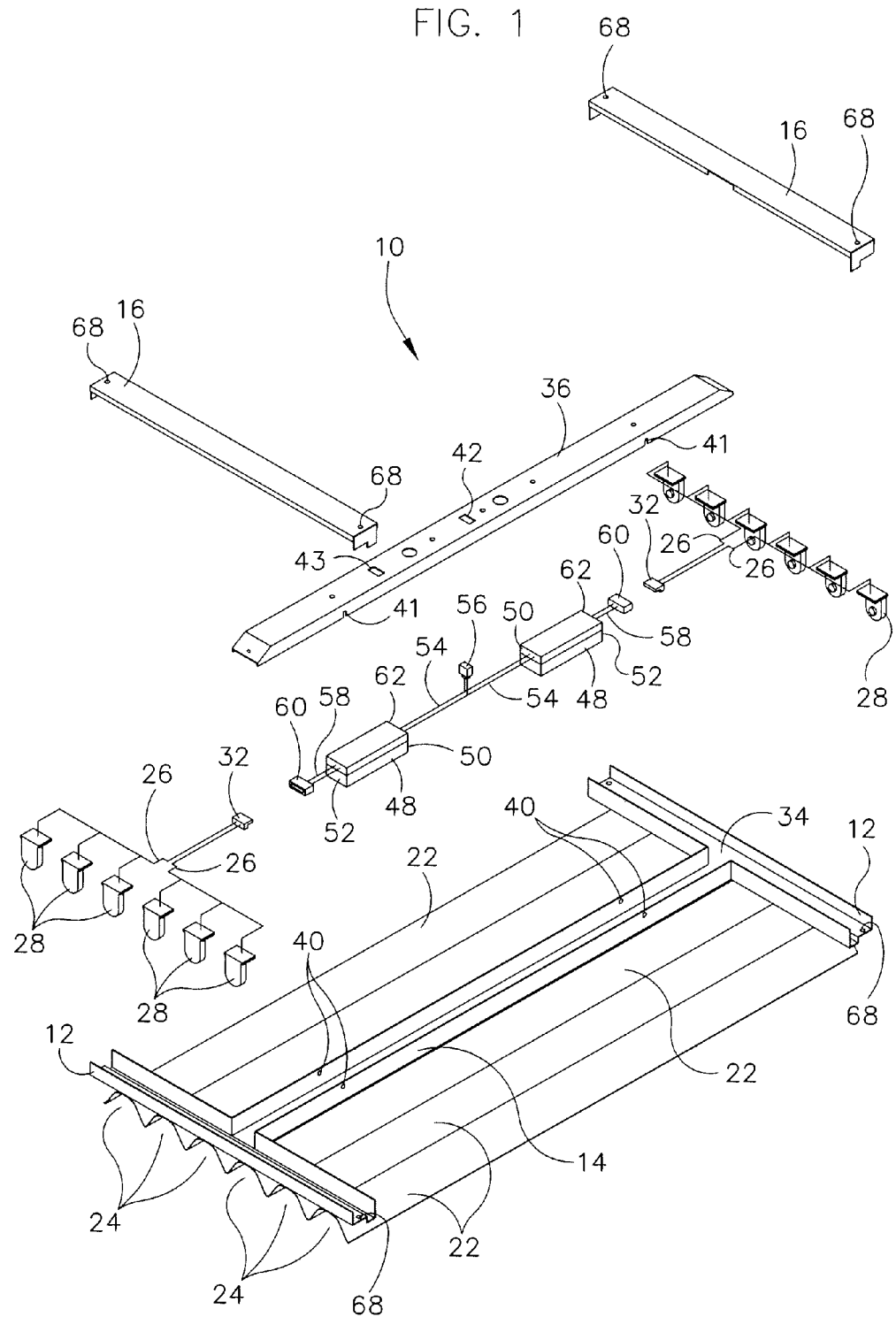
FIG. 1 is an exploded perspective view of one embodiment of a light fixture for use in an apparatus and method according to the invention.

According to an exemplary embodiment, a modular light fixture includes a fixture body having a frame with a top a bottom. The top defines a ballast channel and the bottom has a reflector formed from a sheet material. A lampholder is mounted to the frame and receives and electrically connects to a fluorescent tube positioned adjacent to the reflector. A detachable power pack is removable from the top of the frame and includes a ballast channel cover that detachably engages the ballast channel on the top of frame, and a ballast mounted to the ballast channel cover and having power input wiring, and ballast output wiring electrically connected to the lampholder. A power input connector has a socket portion mounted to the ballast channel cover and electrically connected to the power input wiring of the ballast, and a plug portion connected to a power supply line to provide electrical power from a power source.

According to another exemplary embodiment, a method of installing lighting in a building includes the following steps. Providing a light fixture having a fixture body with a frame having a top side and a bottom side, the top side defining with a ballast channel, and a lampholder mounted to the frame, where the lampholder includes a lampholder harness connector, and a power pack that includes a ballast channel cover detachably mounted to the top side of the frame and over the ballast channel, and a ballast mounted to the ballast channel cover with power input wiring, and a power input connector having a socket portion mounted within an aperture on the ballast channel cover and electrically connected to the power input wiring of the ballast. Another step includes connecting the a plug portion of the power input connector to a flexible power supply line electrically connected to the power source. Another step included coupling the socket portion to the plug portion on the top side of the frame so that the ballast receives power from the power source without removal of the ballast channel cover.

According to another exemplary embodiment, a light fixture kit includes a frame with a top side and a bottom side, and a first raceway and a second raceway on opposite ends of the frame, and a first lampholder mounted to the first raceway and a second lampholder mounted to the second raceway, where the lampholders are electrically connected to a lampholder harness connector. A detachable power pack includes a ballast channel cover that detachably engages the top side of the frame, and a ballast mounted to the ballast channel cover, wherein the ballast comprises power input wiring and ballast output wiring, and a socket portion of a power input connector mounted to the ballast channel cover and electrically connected to the power input wiring of the ballast, and a plug portion of the connector electrically connectable to a power source for providing a live load disconnect capable of supplying power to, and removing power from, the ballast without removal of the ballast channel cover.

FIGS. 1-5 show various views of an exemplary fluorescent tube light fixture 10 for use in a method and apparatus according to the invention. As perhaps best shown in FIGS. 4-5, the fixture 10 consists generally of a fixture body 66 and a detachable power pack 64.

Figure 2:
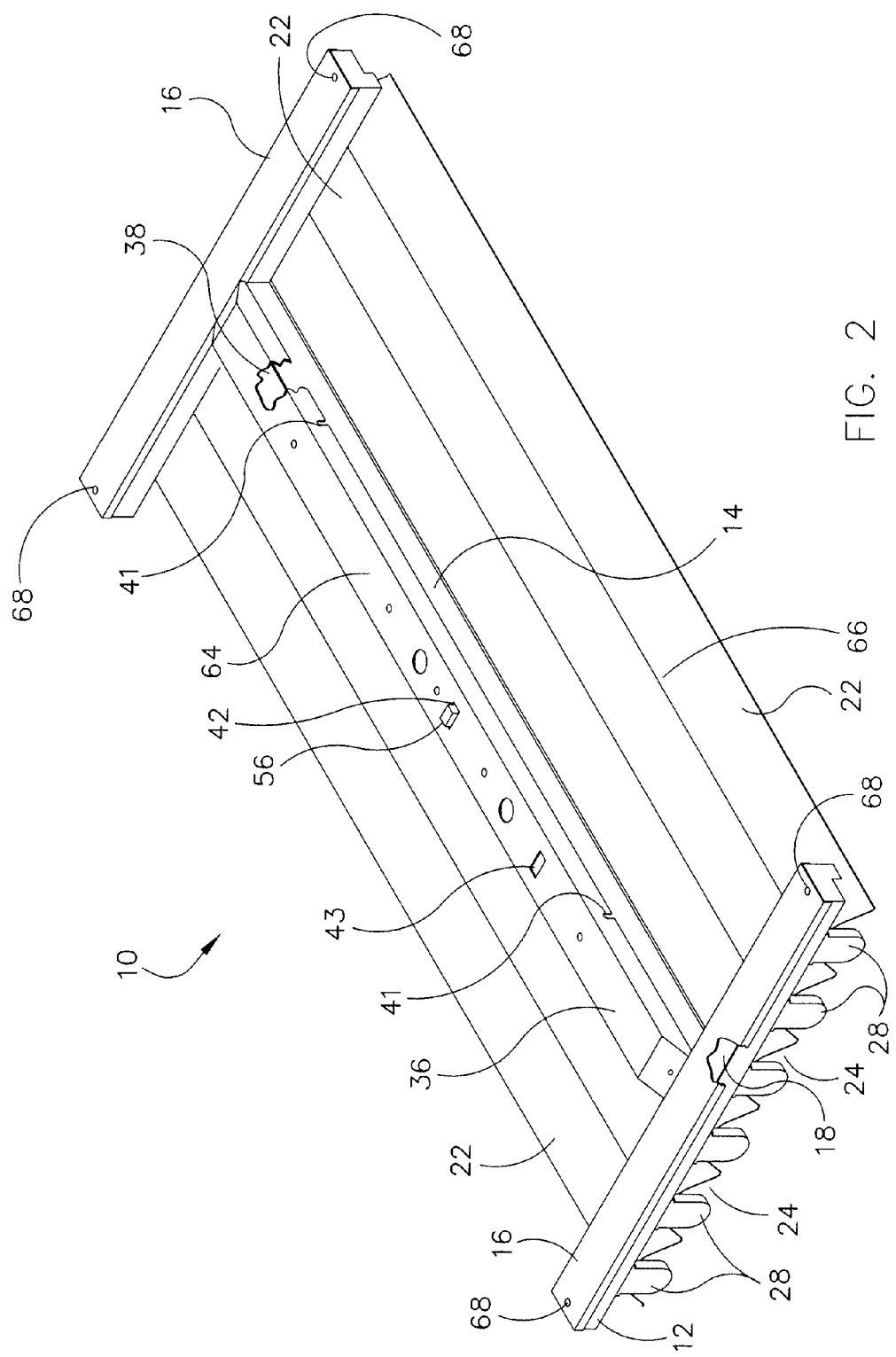
FIG. 2 is an assembled perspective view of the light fixture of FIG. 1.
Figure 3:
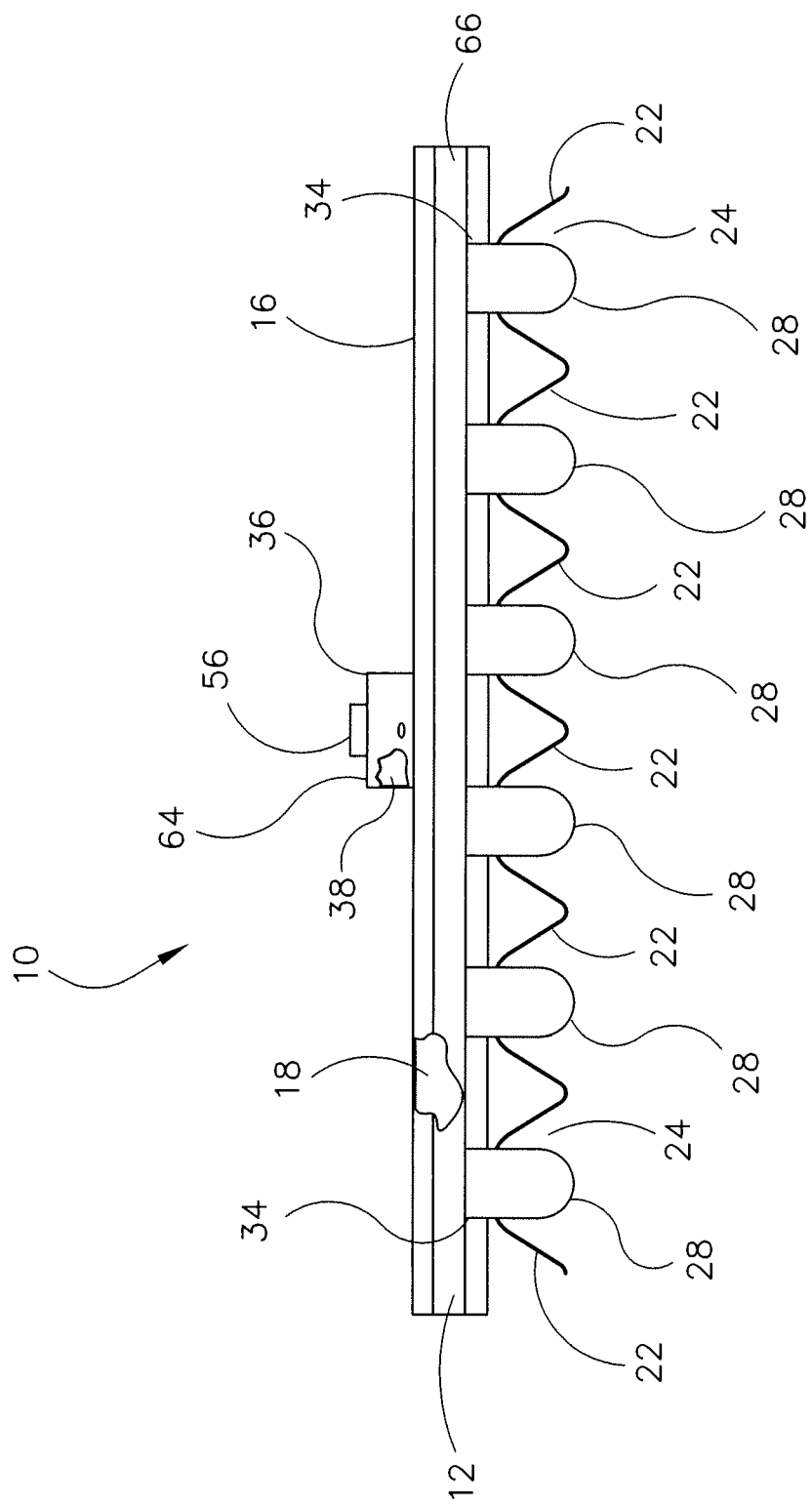
FIG. 3 is an end view of the light fixture of FIG. 1.

The fixture body 66 includes a pair of raceways 12 connected by a ballast channel 14 to form a generally I-frame configuration according to an exemplary embodiment. Each raceway 12 is enclosed with a raceway cover 16, so that the raceway 12 and raceway cover 16 together form a raceway channel 18, as shown in FIGS. 2-3.

Each end of each raceway 12 includes a suspension point 68, for suspending the light fixture 10 above an area to be illuminated, for example using one or more chains connected between the suspension points 68 and the ceiling. The suspension points 68 are located at or near the corners of the fixture according to an exemplary embodiment, to ensure that the suspension hardware does not interfere with maintenance of the light fixture including but not limited to replacement of the detachable power pack 64.

One or more light reflectors 22 are secured to each of the raceways 12 such as by rivets, bolts, screws or the like. Six reflectors are shown in the drawings, however, it should be noted that any number of light reflectors can be used with the present invention. Each light reflector 22 can be fabricated from a single piece of material or can be fabricated of individual pieces of material. Any exposed edges of the light reflectors 22 are folded back (hemmed) to reduce sharp edges and improve safety. In the exemplary embodiment of FIG. 1, each light reflector 22 defines a reflector channel 24 adapted to house a lamp 30 (not shown in FIGS. 1-5), which is a fluorescent tube lamp according to an exemplary embodiment. However, a light fixture as described herein could be used with other types of discharge lamps, such as a metal halide or sodium lamp.

The fixture body 66 includes lampholder harnesses 26 housed in the two raceway channels 18 at the opposite ends of the light fixture. Each lampholder harness 26 includes one or more lampholders (sockets) 28 and a lampholder harness connector 32. Each lampholder 28 extends through a corresponding aperture 34 in a raceway 12 adjacent to the end of a reflector channel 24. In normal operation, a single fluorescent tube lamp extends between a pair of lampholders 28 at opposite ends of each reflector channel 24.

Figure 4:
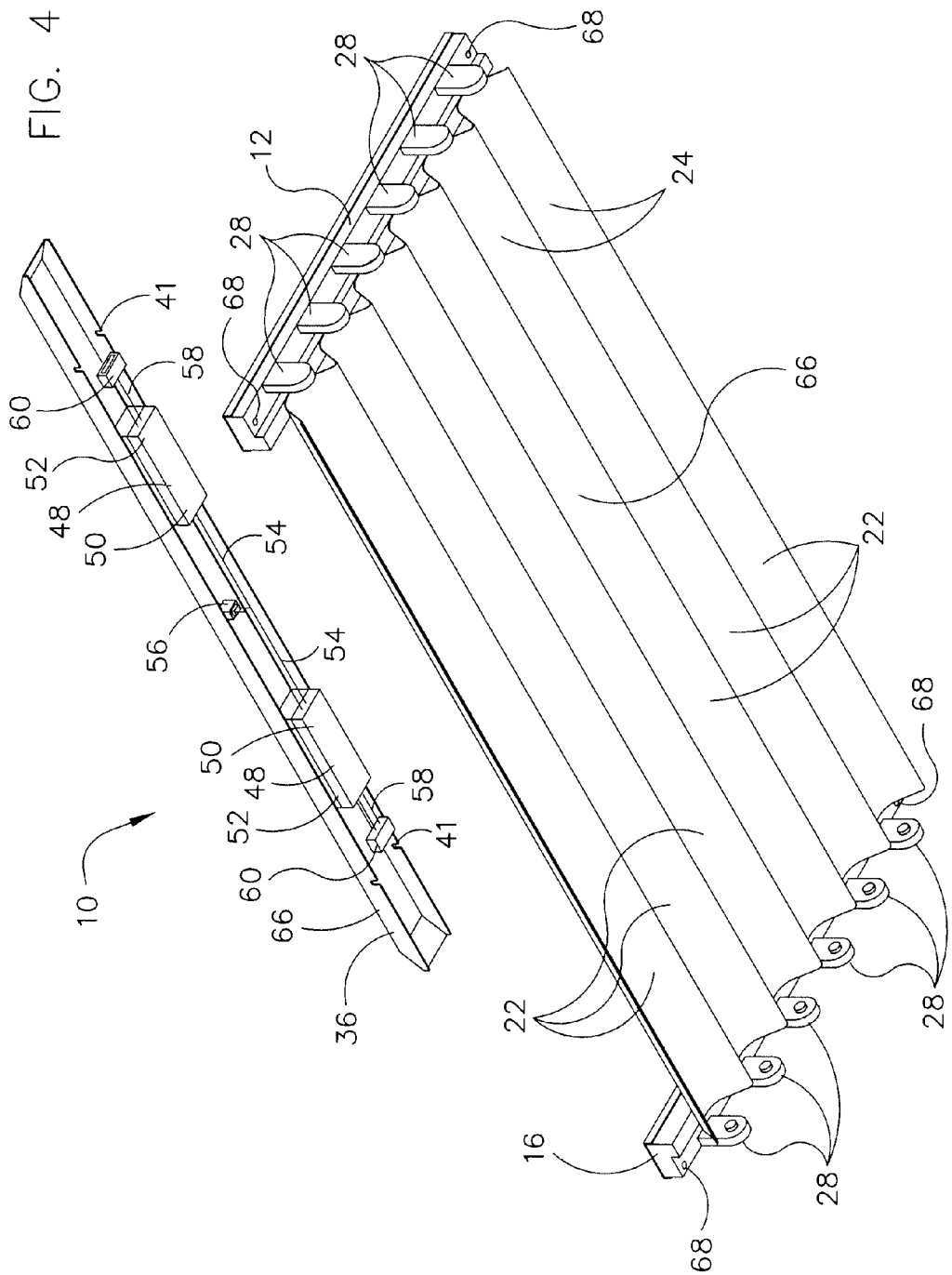
FIG. 4 is a perspective view from below the light fixture of FIG. 1, with the detachable power pack separated from the body of the light fixture.

As perhaps best shown in FIG. 4, the detachable power pack 64 of the light fixture 10 includes a ballast channel cover 36, one or more ballasts 48, power input wiring 54, a modular power input connector 56, ballast output wiring 58, and a modular ballast output connector 60 according to an exemplary embodiment. The detachable power pack 64 is preferably detachable from the light fixture body 66 without the use of tools, and without any interference from the suspension hardware.

Figure 5:
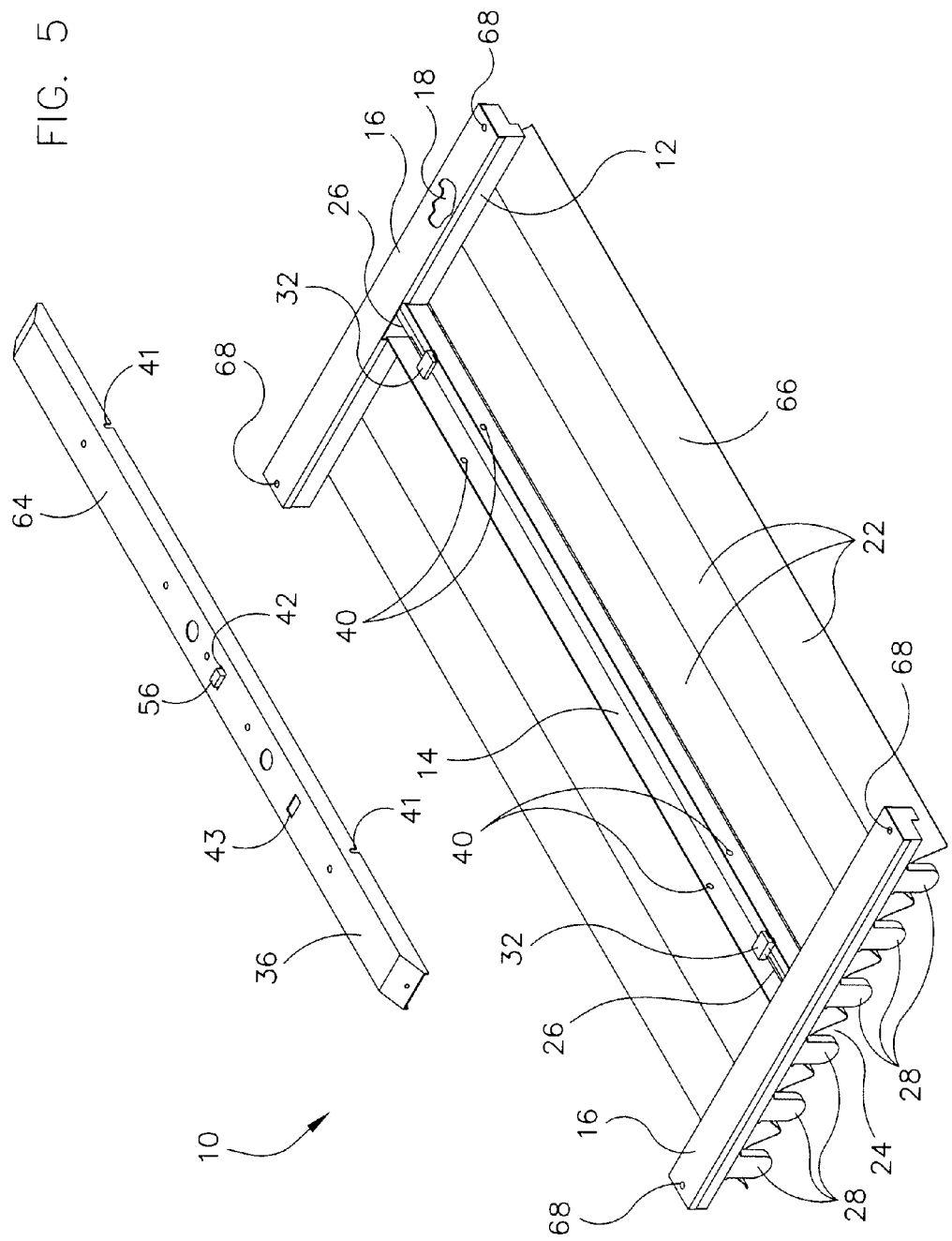
FIG. 5 is a perspective view from the side of the light fixture of FIG. 1, with the detachable power pack separated from the body of the light fixture.

As perhaps best shown in FIGS. 2 and 5, the ballast channel cover 36 of the detachable power pack 64 engages the ballast channel 14 of the fixture body 66 to define a ballast chamber 38. The ballast channel cover 36 includes cover clip portions 41 according to an exemplary embodiment, which mate with corresponding body clip portions 40 to detachably attach the ballast channel cover 36 to the ballast channel 14. The clips provide an interference or frictional fit that can be separated without the use of tools. However, this is not required, and other means, such as screws, could be used to detachably attach the detachable power pack 64 to the fixture body 66.

The ballast channel cover includes a power line connector aperture 42 adapted to receive a modular power input connector 56, and a feature connector aperture 43 adapted to receive a feature connector (not shown). The modular power input connector 56 is preferably a polarized modular power input socket 210 configured for the available electrical power supply voltage and configuration, as discussed in more detail below in reference to FIGS. 9-10. However, this is not required, and other methods can be used to supply electrical power to the fixture, as discussed in more detail below in reference to FIGS. 6(a)-6(c).

The exemplary detachable power pack 64 of the light fixture 10 includes two ballasts 48, for example a model 49776 electronic ballast available from GE Lighting of Cleveland, Ohio. However, this is not required, and other makes and models of ballasts can be employed. Further, while the exemplary light fixture 10 includes two ballasts 48, a greater or lesser number of ballasts 48 can be used.

Each ballast 48 has a first (input) end 50 and a second (output) end 52. Power input wiring 54 electrically connects the modular power input connector 56 to the first end 50 of each ballast 48. As discussed in more detail below in reference to FIGS. 9-10, the modular power input connector 56 mates with a modular power cord assembly 180 supplying electrical power. The modular power cord assembly 180 is preferably quickly and easily disconnected from the modular power input connector 56 without the use of tools, in order to verifiably and positively remove electrical power from the fixture to reduce the risk of electrical shock during maintenance.

Ballast output wiring 58 electrically connects the second (output) end 52 of each ballast 48 to a modular ballast output connector 60. The modular ballast output connector 60 mates with a corresponding lampholder harness connector 32. The modular ballast output connector 60 is preferably quickly and easily disconnected from the lampholder harness connector 32 without the use of tools.

Each ballast 48 is fastened to the ballast channel cover 36, for example using threaded fasteners to engage mounting ears 62 on each ballast 48 through holes in the ballast channel cover 36. However, threaded fasteners are not required and other means can be utilized to fasten each ballast 48 to the ballast channel cover 36, such as adhesives or interference mounting techniques.

When the ballast 48 is secured to the ballast channel cover 36, the modular power input connector 56 is configured to extend through the aperture 42 for connection to a modular power cord assembly 180 (not shown in FIGS. 1-5). The ballast channel cover 36 may be positioned above the ballast 48, with good thermal contact between the ballast 48 and ballast channel cover 36, so waste heat generated by the ballast 48 conducts upwardly to the ballast channel cover 36. The ballast channel cover 36 may be positioned at the top of the fixture 10, and exposed to air circulation so waste heat from the ballast can radiate away from the light fixture.

In the embodiment of FIG. 1, when the detachable power pack is attached to the fixture body 66, each ballast 48 is housed in the ballast chamber 38, and oriented so that the modular ballast output connectors 60 of the power pack 46 can mate with the modular lampholder harness connectors 32 of the lampholder harnesses 26.

When the modular ballast output connectors 60 mate with the modular lampholder harness connectors 32, the ballasts 48 are electrically connected to deliver power to the lampholder harnesses 26, the lampholders 28, and the lamps 30 (not shown in FIGS. 1-5). Suitable mating modular ballast output connectors 60 and modular lampholder harness connectors 32 are a male and female connector pair available as models 231-604 and 231-104/02600 from Wago Corp. of Germantown, Wis. However, this is not required and other types, makes and models of mating modular connectors can be used.

FIGS. 4 and 5 are perspective views of the light fixture of FIG. 1, with the detachable power pack 64 separated from the fixture body 66 of the light fixture 10. The following discussion of exemplary methods for modifying or servicing a light fixture according to another exemplary embodiment is by way of explanation, and is not necessarily a limitation on the scope of the invention(s) as defined by the claims. Replacing the detachable power pack 64 in a light fixture 10, for example to change the ballast characteristics in response to changing light requirements or to service a failed ballast, is straightforward and does not necessarily require a high level of skill or the use of tools.

First, the modular power cord 180 is disconnected from the modular power input connector 56, thereby positively and verifiably cutting off electrical power from the light fixture 10 to improve the safety of the procedure. Second, the old detachable power pack 64 is separated from the body 66 of the light fixture by uncoupling the cover clip portions 41 from the body clip portions 40, and by disconnecting the modular ballast output connectors 60 from their corresponding lampholder harness connectors 32. The old power pack 64 can then be set aside for eventual disposal or repair.

When reassembling the light fixture 10 with a new or replacement power pack 64, the reverse of the above procedure is performed. First, the ballast output connectors 60 on the new power pack 64 are mated with their corresponding lampholder harness connectors 32. Next, the new power pack 64 is detachably fastened to the body 66 of the light fixture by coupling the cover clip portions 41 with the body clip portions 40. Finally, modular power cord 180 is reconnected to the modular power input connector 56 to restore power to the light fixture 10 for normal operation.

It should be noted that the concepts described in the present application can be employed with other fixtures, and the invention(s) are not limited to the light fixture shown and described herein. For example, another fluorescent tube light fixture embodiment in which the present invention(s) can be employed is that shown and described in U.S. Pat. No. 6,585,396, which is hereby incorporated by reference.

Figure 6B:
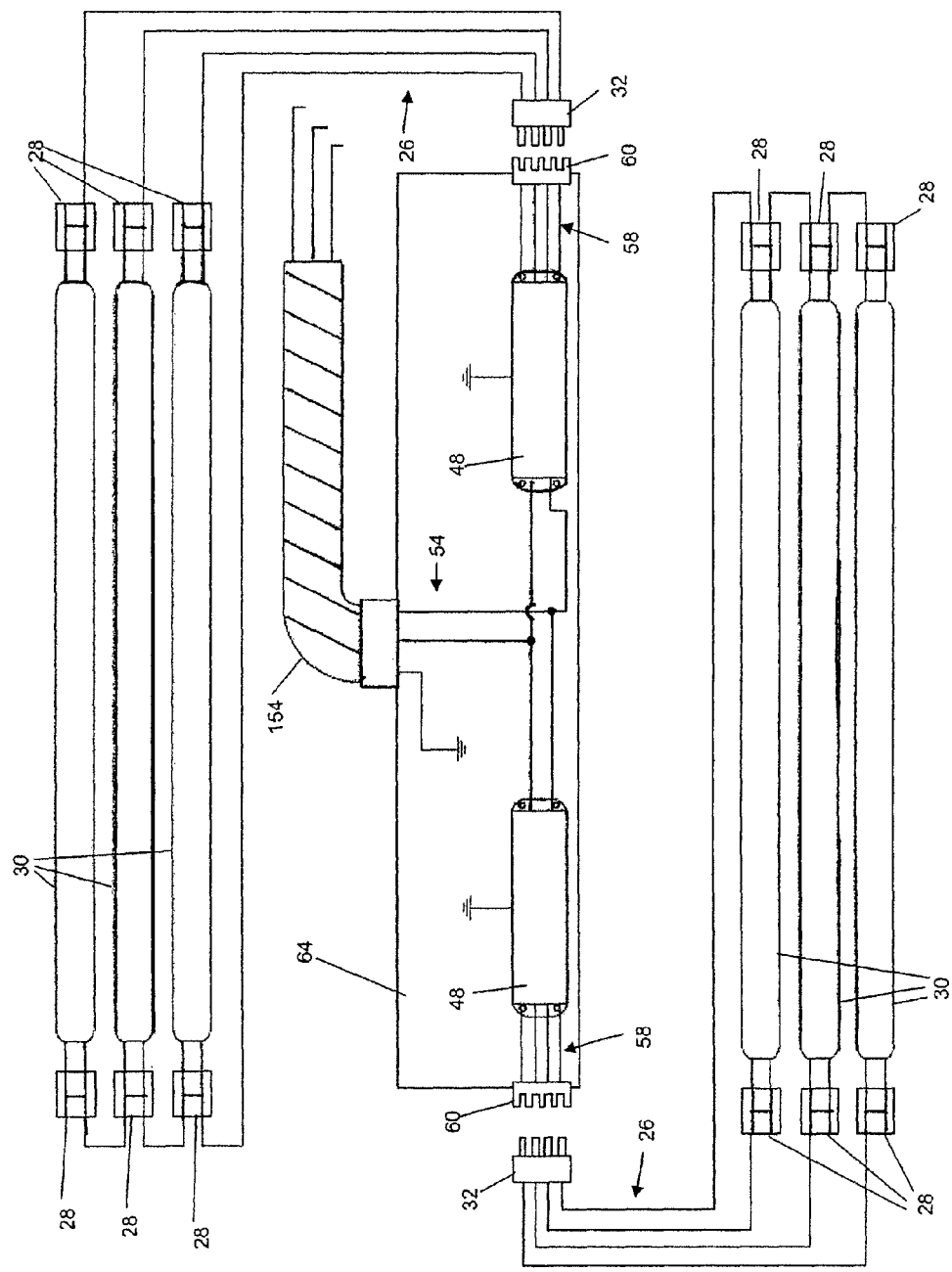
FIGS. 6(*a*)-6(*c*) are circuit diagrams for light fixtures according to the invention having detachable ballast assemblies with hard-wired, armored whip, and modular connector input power configurations, respectively.

FIGS. 6(a)-6(c) are circuit diagrams for light fixtures according to exemplary embodiments having detachable ballast assemblies with alternative input power configurations. A variety of alternative input power configurations may be provided to allow a light fixture according to the exemplary embodiments described herein to be used with a variety of available power sources. These alternative input power configurations can be classified generally into "hard wire" configurations, and "modular" configurations. Light fixtures according to the exemplary embodiments described herein can include either input power configuration.

FIGS. 6(a) and 6(b) show examples of hard wire input power configurations. The detachable power pack 64 of FIG. 6(a) includes a hard wire power supply connector 152. The hard wire power supply connector 152 represents a connection which is hard wired directly to a branch circuit in the building, for example by an electrician. The detachable power pack 64 of FIG. 6(b) includes one type of hard wire power supply connector, an armored whip power supply line 154.

The detachable power pack 64 of FIG. 6(c) includes a modular wiring system power supply line 156. An alternative, "daisy chain" modular wiring system power supply line is described, for example, in U.S. Pat. No. 6,746,274, the contents of which are incorporated by reference.

While the exemplary circuit diagrams of FIGS. 6(a)-6(c), and the disclosure of U.S. Pat. No. 6,746,274 show specific combinations of input power configurations with particular types of ballasts, these specific combinations are not required. It should be understood that any of these input power configurations can be used with a light fixture according to any of the embodiments described herein, as appropriate for the environment in which the light fixture is to be installed. It should also be understood that any of these power supply configurations can be used with any type of ballast, not just the particular types of ballasts shown in FIGS. 6(a)-6(c).

FIGS. 7(a)-7(e) are circuit diagrams for light fixtures according to various exemplary embodiments having detachable ballast assemblies with alternative ballast configurations. Advantageously, such a variety of alternative ballast configurations can allow a light fixture to provide a wider variety of light levels at varying power consumption levels.

Figure 7A:
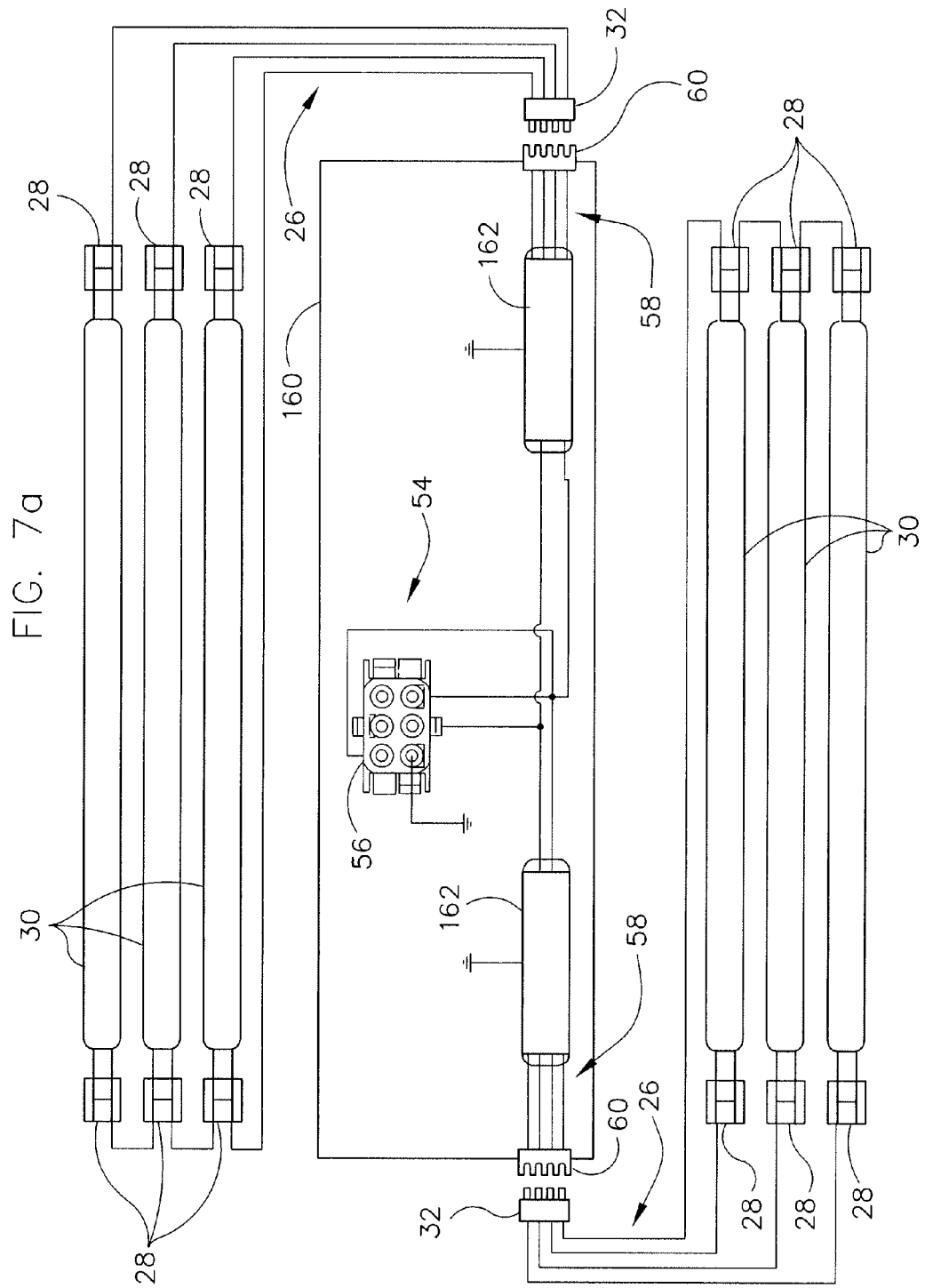
FIGS. 7(*a*)-7(*e*) are circuit diagrams for light fixtures according to the invention having detachable ballast assemblies with normal ballast factor, low ballast factor, high ballast factor, dual switch/high ballast factor, and battery backup/high ballast factor configurations, respectively.

The detachable power pack of FIG. 7(a) is a high ballast factor detachable power pack 160 that includes a high ballast factor ballast 162.

Figure 7B:
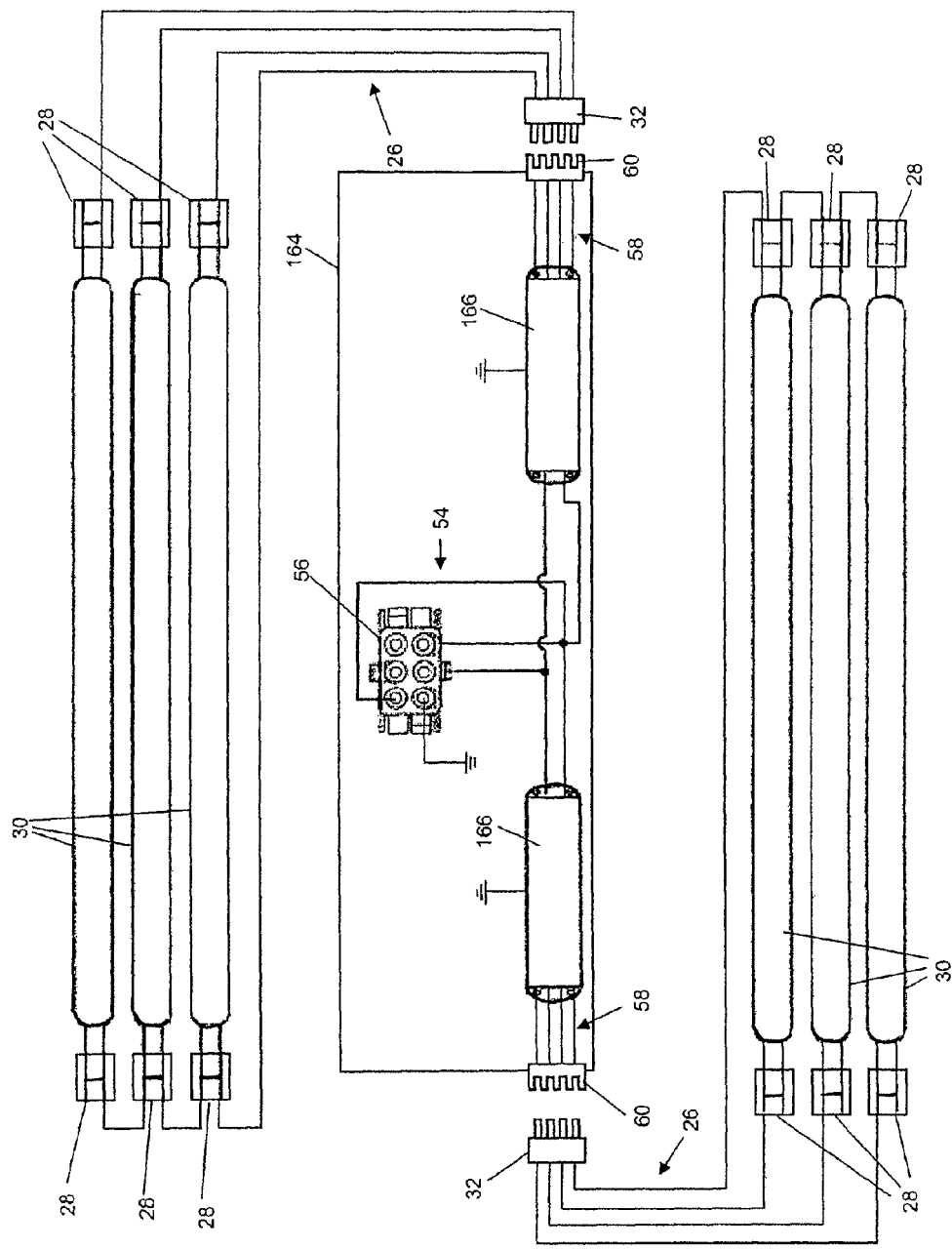

The detachable power pack of FIG. 7(b) is a normal ballast factor detachable power pack 164 that includes a normal ballast factor ballast 166.

Figure 7C:
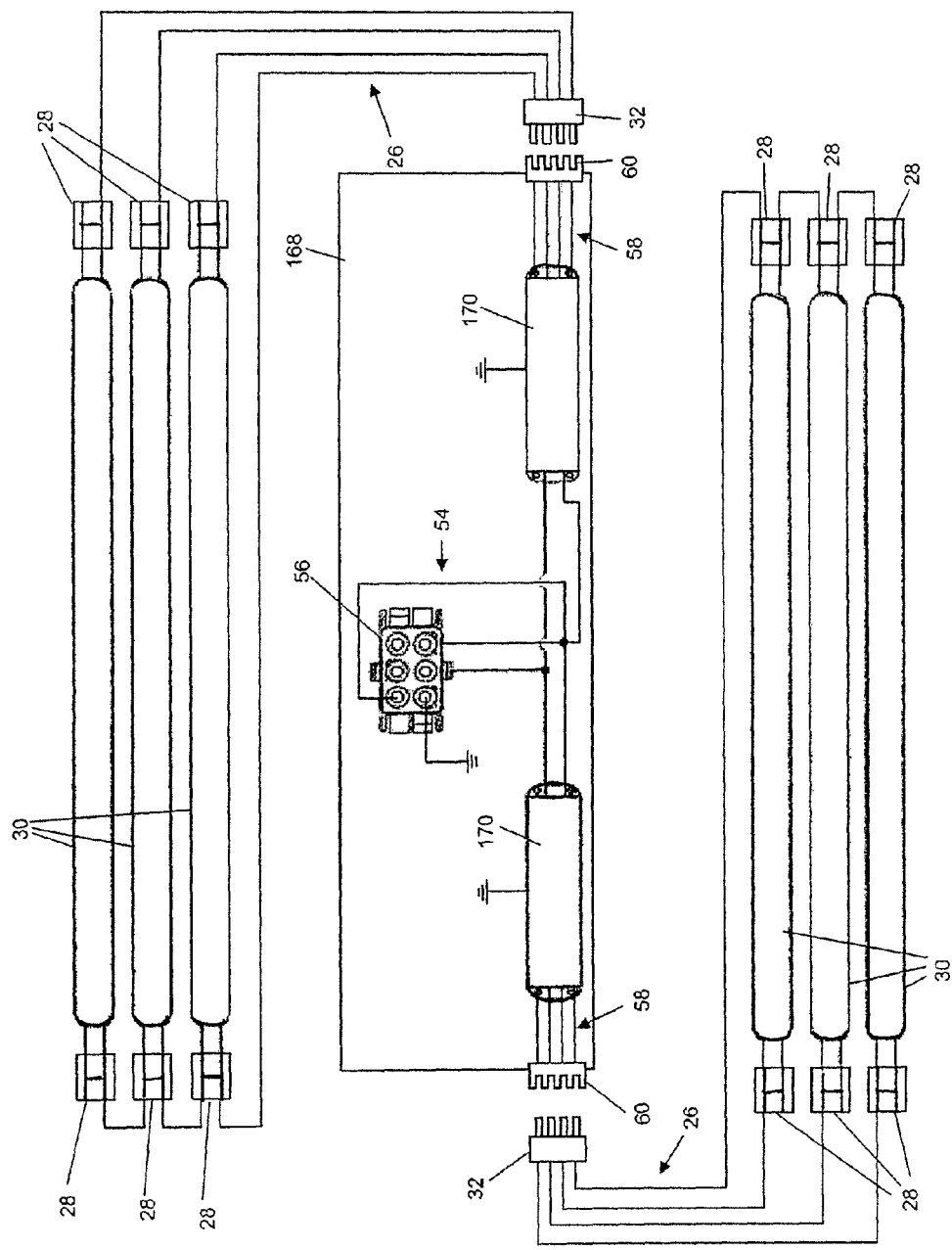

The detachable power pack of FIG. 7(c) is a low ballast factor detachable power pack 168 that includes a low ballast factor ballast 170.

Figure 7D:
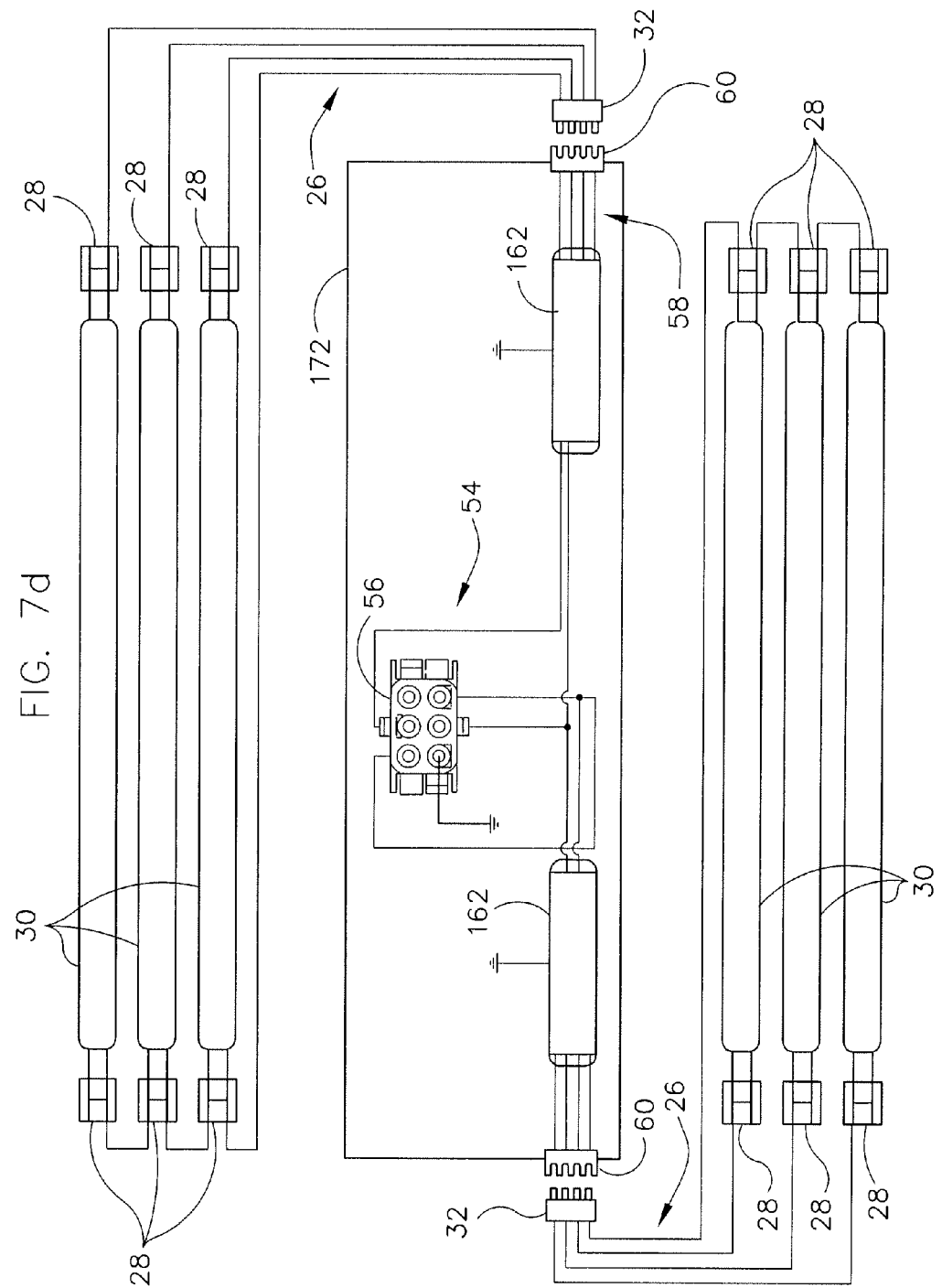

The detachable power pack of FIG. 7(d) is a dual switched detachable power pack 172 that includes two high ballast factor ballasts 162 that receive independent power on separate lines from the modular power input connector 56.

Figure 7E:
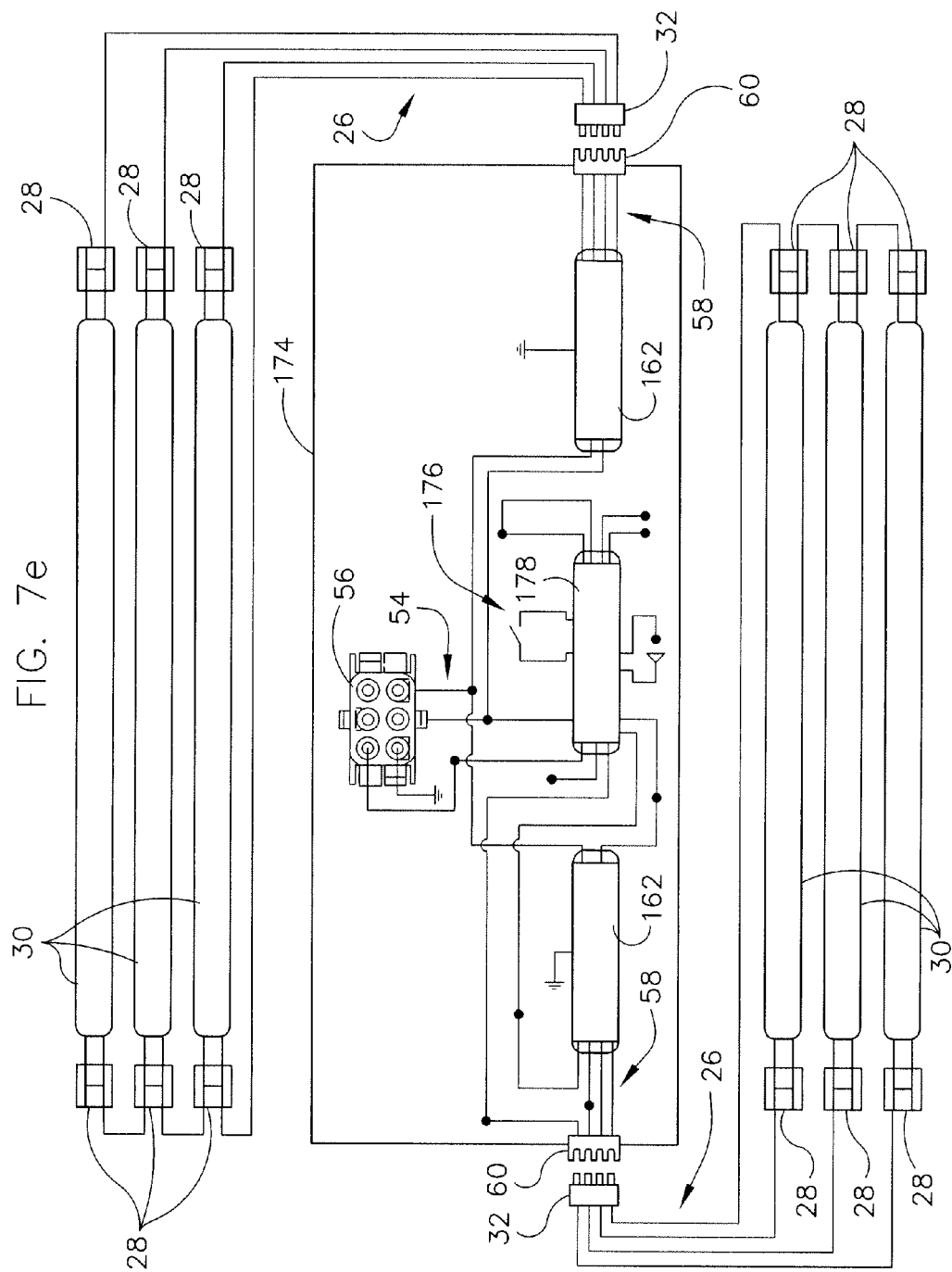

The detachable power pack of FIG. 7(e) is a battery backup detachable power pack 174 that includes battery backup circuitry 176, a battery backup ballast 178, and two high ballast factor ballasts 162. The battery backup ballast 178 can supply lighting in the event of a failure of the main electrical supply, for example in the case of a natural disaster or fire.

FIG. 8(a) shows a modular power cord assembly 180 having a first end that terminates in a polarized modular power supply plug, and a second end that terminates in a conventional power plug 182.

The modular power cord assembly 180 includes a suitable length of conventional insulated power cord 181 with 3 or 4 insulated conductors surrounded by an insulated jacket. The power cord 181 can be any standard electrical power cord having suitable power handling and other specifications, for example 18 gauge 3-conductor or 18 gauge 4-conductor power cord can be used. According to an exemplary embodiment, a variety of cord lengths, for example from 3' to 35' in length, are kept in stock, allowing the appropriate cord length to be chosen from stock at the time the light fixture is installed, without requiring any delay for custom manufacturing of a modular power supply cord having the appropriate length.

The polarized modular power supply plug may be a 6-pin "Mate-N-Lock" plug connector of the type sold by the AMP division of Tyco Electronics of Harrisburg, Pa. However, this is not required and other types, makes and models of modular power supply connectors can be used. The polarized modular power supply plug may include strain relief, for example two strain relief pieces 184 and a plastic insert 185 (such as AMP P/N 640715-1), and a plug body 188. The strain relief 184, plastic insert 185, and plug body 188 can be held together with screws 186, such as #6×⅝" sheet metal screws.

According to an exemplary embodiment, the plug body 188 has six positions for holding electrical pins, although a plug body having a greater or lesser number of pin positions could be used. A short portion of the insulation is stripped from the end of each conductor in the electrical cord 181, and an electrical pin is electrically and mechanically connected to the stripped portion. The electrical pins and attached conductors are then inserted into specific pin positions in the plug body 188 to form a polarized modular power supply plug 158, as discussed in more detail below in reference to FIGS. 10(a)-10(j).

The "extra long" electrical pin 190 used for the green (safety ground) line may be slightly longer than the "standard length" electrical pins 192 used for the black (power supply or "hot"), white (power return or neutral), and red (switched power) lines. This helps ensure that the safety ground connection is made first and broken last when the plug 158 is inserted into or removed from its corresponding socket. A suitable extra long electrical pin 190 for the safety ground would be AMP PN 350669, and a suitable standard length electrical pin 192 for the other lines would be AMP PN 350547-1.

The conventional power plug 182 can be any standard electrical plug configuration, such as a NEMA 5, NEMA L5, NEMA L7, NEMA 6, or NEMA L6 plug. According to an exemplary embodiment, a variety of plug configurations are kept in stock, allowing the appropriate plug configuration to be chosen from stock at the time the light fixture is installed, without requiring any delay for custom manufacturing of a modular power supply cord having the appropriate plug configuration.

FIG. 8(b) shows an alternative modular power cord assembly 198 having a first end that terminates in a polarized modular power supply plug, and a second end that terminates in stripped conductors 196, and about ⅜" in length according to an exemplary embodiment. The modular power cord assembly 198 is similar in construction to the modular power cord assembly 180, except that the modular power cord assembly 198 terminates in stripped conductors 196 that can be used, for example, to hardwire the fixture to building power, and the modular power cord assembly 198 is wired for "universal" application. FIG. 8(c) shows a "dual switch" modular power cord assembly 199 that is otherwise similar in construction to the modular power cord assembly 198.

FIG. 9 shows exemplary power input wiring 54 for a detachable power pack in a light fixture according to an exemplary embodiment. The exemplary power input wiring 54 includes at least 3 insulated conductors, including a safety ground (green) wire 200, a power return (white) wire 202, and a power supply (black) wire 204. Depending on the application, the power input wiring 54 may also include a switched power (red) wire 206, and a second power supply (black) wire 204. Each conductor is made of a suitable length of insulated wire, for example UL 1015 18 AWG wire rated for 105° C. and 600V can be used.

One end of the power input wiring terminates in a modular power input connector 56, which is may be a polarized modular power input socket 210 such as a 6-pin "Mate-N-Lock" socket connector of the type sold by the AMP division of Tyco Electronics of Harrisburg, Pa.

According to an exemplary embodiment, the polarized modular power input socket 210 includes a socket body 208 having six positions for holding single conductor sockets, although a socket having a greater or lesser number of single conductor socket positions could be used. A short portion of the insulation is stripped from the end of each conductor, and a single conductor socket 193, for example AMP PN 350550-1, is electrically and mechanically connected to the stripped portion, for example by crimping and/or soldering. The single conductor socket 193 and attached conductor are then inserted into a specific single conductor socket position in the socket body 208 to form the polarized modular power input socket 210, as discussed in more detail below in reference to FIGS. 10(a)-10(j).

Figure 10A:
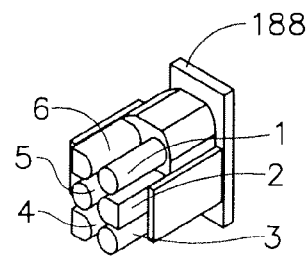
FIGS. 10(*a*)-10(*j*) show exemplary pin assignments for the input power plug and socket connectors in various configurations for use according to the invention.
Figure 10B:
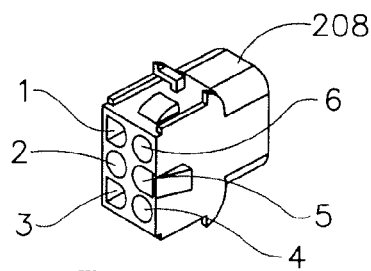

FIGS. 10(a)-10(j) shows exemplary pin assignments for the input power plug and socket connectors in various configurations of a detachable power pack for use in a light fixture according to an exemplary embodiment. However, these pin assignments are not required, and other pin assignments could be used. FIGS. 10(a) and 10(b) illustrate a convention for numbering the pins (1-6) in the input power plug and socket connectors.

Figure 10C:
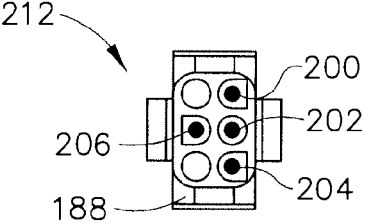
Figure 10D:
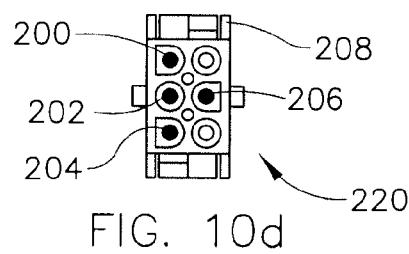

FIGS. 10(c) and 10(d) illustrate an exemplary 120V power supply configuration. The exemplary 120V power supply configuration uses a 120V modular power supply plug 212 along with a 120V modular power input socket 220. The plug 212 and socket 220 each include at least a safety ground (green) wire 200, a power return (white) wire 202, and a power supply (black) wire 204 located at specific positions in plug head 188 and socket head 208, respectively. When used in a 120V dual-switched configuration, the plug 212 and socket 220 also include a second power (red) wire 206.

Figure 10E:
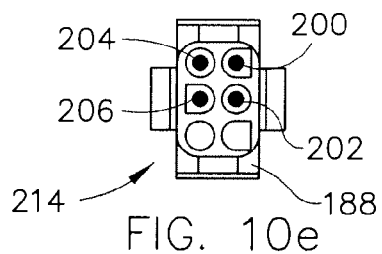
Figure 10F:
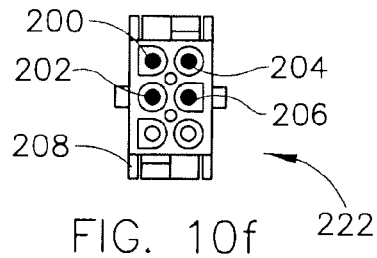

FIGS. 10(e) and 10(f) illustrate an exemplary 277V power supply configuration. The exemplary 277V power supply configuration uses a 277V modular power supply plug 214 along with a 277V modular power input socket 222. Like the 120V plug 212 and 120V socket 220, the 277V plug 214 and the 277V socket 222 each include at least a safety ground (green) wire 200, a power return (white) wire 202, and a power supply (black) wire 204. The safety ground (green) wire 200 and the power return (white) wire 202 of the 277V configuration are at the same pin positions as in the 120V configuration, however the power supply (black) wire 204 is at a different pin position. When used in a 277V dual-switched configuration, the plug 214 and socket 222 also include a second or switched power (red) wire 206.

Figure 10G:
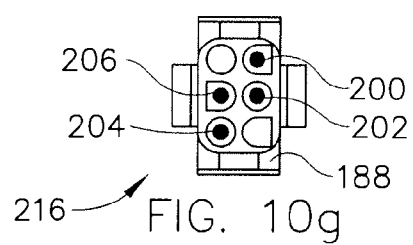
Figure 10H:
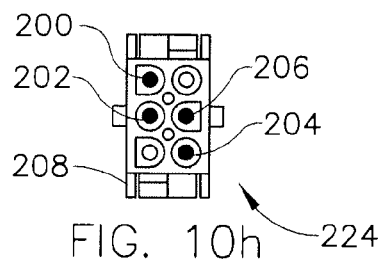
Figure 10I:
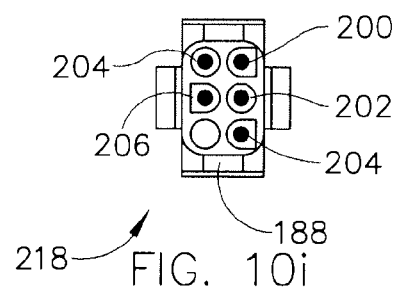
Figure 10J:
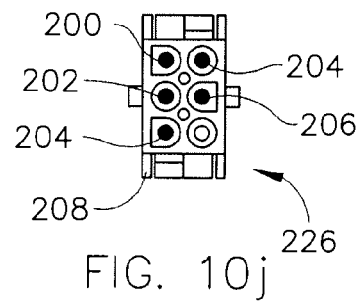

FIGS. 10(g) and 10(h) illustrate an exemplary 347/480V poser supply configuration. The exemplary 347/480V power supply configuration of uses a 347/480V modular power supply plug 216 along with a 347/480V modular power input socket 224. Like the 120V and 277V configurations, the 347/480V plug 216 and the 347/480V socket 224 each include at least a safety ground (green) wire 200, a power return (white) wire 202, and a power supply (black) wire 204. The safety ground (green) wire 200 and the power return (white) wire 202 of the 277V configuration are at the same pin positions as in the 120V and 277V configurations, however the power supply (black) wire 204 is at a different pin position. When used in a 347/480V dual-switched configuration, the plug 216 and socket 224 also include a second or switched power (red) wire 206.

FIGS. 10(*i*) and 10(*j*) illustrate an exemplary "UNV" or "universal" power supply configuration. The exemplary "UNV" or "universal" power supply configuration of uses a UNV modular power supply plug 218 along with a UNV modular power input socket 226. A light fixture wired with the UNV power supply socket configuration can be used with either a 120V supply cord or a 277V supply cord. A light fixture wired with the 120 v power supply socket configuration can be used with either a 120V supply cord or a UNV supply cord. A light fixture wired with the 277 v power supply socket configuration can be used with either a 277V supply cord or a UNV supply cord.

The UNV plug 218 and the UNV socket 226 each include at least a safety ground (green) wire 200 and a power return (white) wire 202, in the same pin and socket positions as the 120V, 277V, and 347/480V configurations. However, the UNV plug 218 and the UNV socket 226 each include two power supply (black) wires 204, one power supply (black) wire 204 at each of the two pin positions used for the power supply (black) wire 204 in the 120V and 277V configurations. When used in a 120V or 277V dual-switched configuration, the plug 218 and socket 226 also include a second or switched power (red) wire 206.

Figure 12A:
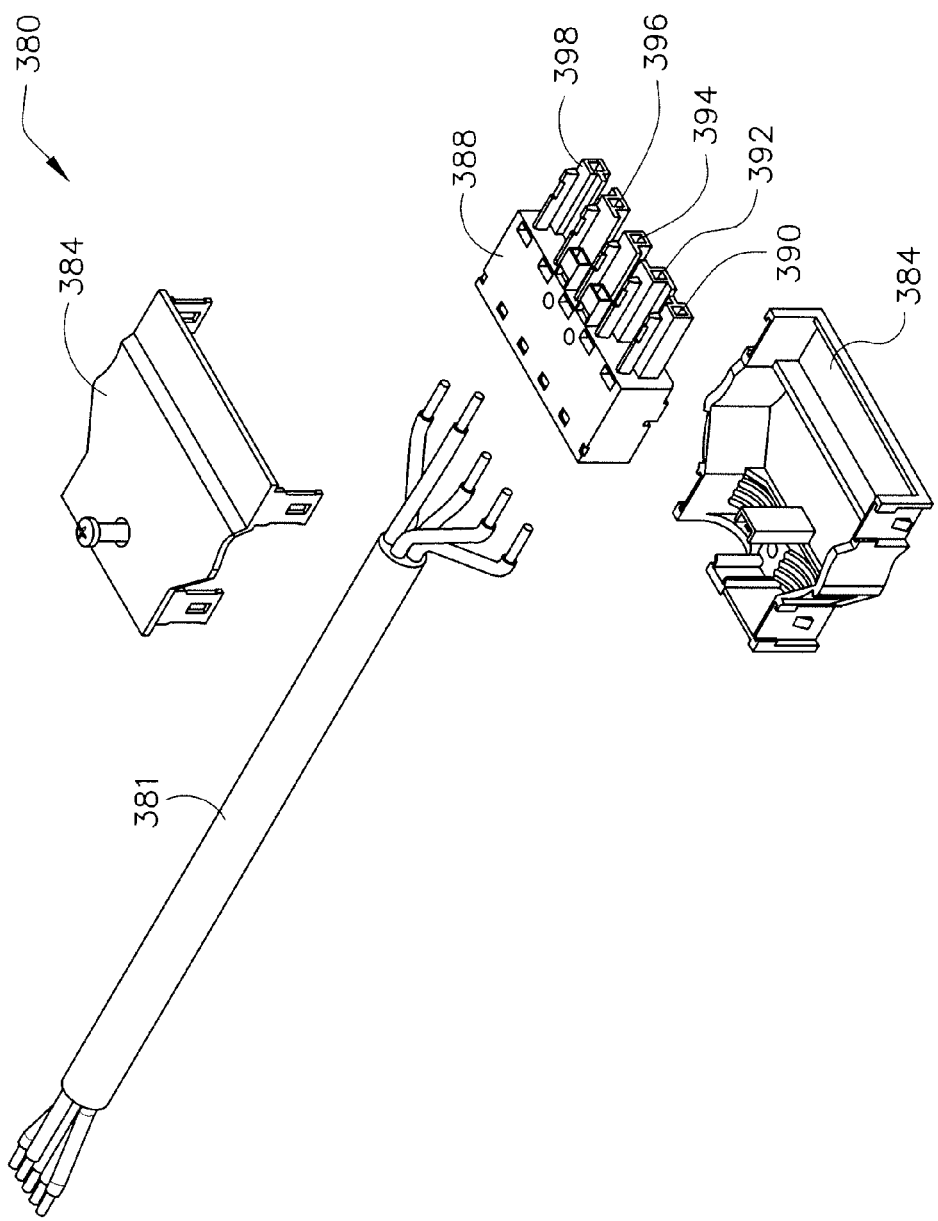
FIGS. 12(*a*) and 12(*b*) are perspective views of modular power supply cords and connectors according to another exemplary embodiment.

Referring to FIGS. 12(*a*) and 12(*b*), another polarized modular power supply connector (e.g. power input connector) is shown according to an exemplary embodiment and includes a plug portion 380 (the corresponding socket portion is shown in FIG. 13(*b*)). The polarized modular power supply plug may be a five-pin "Winsta" type plug-in connector of the type sold by the WAGO Corporation of Germantown, Wis. However, this is not required and other types, makes and models of modular power supply connectors can be used. The plug portion 380 of the polarized modular power supply connector may include strain relief, for example two strain relief pieces 384, and a plug body 388. The strain relief 384 and plug body 388 can be held together with screws, such as #6×⅝" sheet metal screws, or other suitable fastener.

According to an exemplary embodiment, the plug body 388 has ten positions for holding electrical wires, although a plug body having a greater or lesser number of wire positions could be used (e.g., such as eight wire positions). A short portion of the insulation is stripped from the end of each conductor in the electrical cord 381 and are then inserted into specific wire positions in the plug body 388 to form a polarized modular power supply connector, as discussed in more detail below in reference to FIGS. 13(*a*) and 13(*b*). Electrical cord 381 provides a flexible electrical power supply line that is connectable with a power source in a building through a connector 383 (shown in FIG. 12(*b*)) or by hardwiring individual conductors (shown in FIG. 12(*a*)). According to one embodiment, a plurality of electrical cords 381 are disposed at locations throughout a building at locations corresponding to light fixture installations and have one end pre-wired to a power supply within the building and the other end pre-wired to a plug (or socket) portion, so that the light fixtures may be pre-assembled at a factory with a socket (or plug) portion of the connector within the ballast cover, and then shipped to the building, installed at the appropriate locations in the building, and then electrically connected simply by connecting the socket and plug portions of the connector for each light fixture.

Referring further to FIG. 13(*a*), the plug portion 380 of the modular power supply connector is shown by way of example to include five conductive projections (e.g. pins, posts, pegs, prongs, etc.) 390, 392, 394, 396 and 398. However, according to other embodiments, any number of projections, such as four, eight, etc. may be provided to suit an intended number of conductors for a particular lighting application. Each of the projections 390, 392, 394, 396 and 398 are shown to include a substantially square cross section with a hollow interior. The projections are also shown to include one or more extensions (e.g. ribs, ridge, etc.) extending longitudinally from the square cross section of the projection to mate with a corresponding receptacle or socket in a corresponding socket portion of the modular connector, shown as power input connector 456 in FIG. 13(*b*). By way of example, "outside" projections 390 and 398 are shown to include an extension 400 extending from a mid section of the projections, and "inside" projections 392 and 396 are each shown to have a pair of extensions, 402 and 404, extending from a top and bottom of the projection respectively and parallel to one another, and "center" projection 394 include an extension 406 extending from a top side of the projection. According to alternative embodiments, the extensions may be arranged in any suitable pattern or arrangement to ensure proper orientation and mating of the plug portion 380 and the socket portion 456 of the power input connector.

Each of the projections and their extension(s) are configured to be received in a mating conductive recess or socket, shown as conductor sockets 490, 492, 494, 496 and 498 in the socket portion 456 of the connector (e.g. power input connector—shown in FIG. 13(*b*)). Each of conducting sockets 490, 492, 494, 496 and 498 includes a cross sectional shape corresponding to the pattern of extensions provided on the projections 390, 392, 394, 396 and 398, and is electrically and mechanically connected to power input wiring 54 (in the manner as shown in FIG. 4). In a manner similar to the socket portion of modular power input connector 56, socket portion 456 provides another embodiment of a modular connector portion that extends through, and is retained within, aperture 42 in the ballast channel cover 36 for use in making a rapid connection, and a rapid "live-load" disconnection, of the plug portion 380 from the socket portion 456 without removal of the ballast channel cover 36 or other portion of the fixture.

Figure 11:
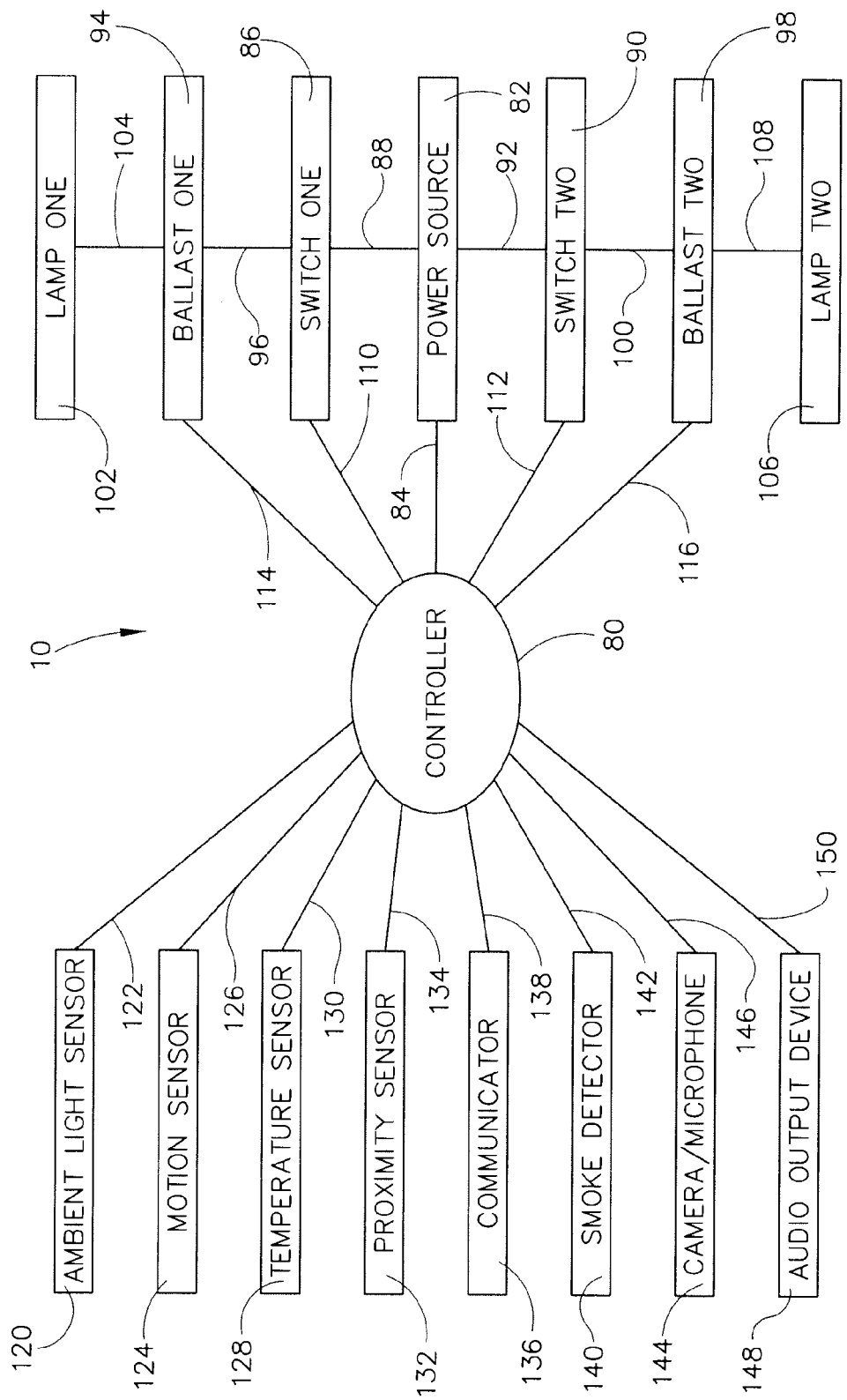
FIG. 11 is a block diagram of a controller and related components in other embodiments of a light fixture according to the invention.

Referring now to FIG. 11, a modular light fixture according to an exemplary embodiment can include a controller 80, for example a microprocessor or microcontroller of the types known in the art. The controller 80 may include suitable non-volatile program memory, for example read-only memory (ROM) such as an electrically programmable read only memory (EPROM or EEPROM). The controller 80 may also include suitable random access memory, for storage of dynamic state variables such as environmental signals and current day/time.

The light fixture includes a power source 82, such as an electrical connector which is connected to line voltage during normal operation, that is able to deliver electrical power to the controller 80 through a controller power supply line 84.

The light fixture may include a plurality of independently controllable lamp circuits. For example, the block diagram of FIG. 6 shows a light fixture with a first independently controllable lamp circuit that includes lamp one 102 and a second independently controllable lamp circuit that include lamp two 106. However, this is not required and a single lamp circuit can be used.

Each independently controllable lamp circuit may include a ballast and an optional switch. For example, lamp circuit for lamp one 102 includes a switch one 86 that receives electrical power from the power source 82 on a power supply line 88. The switch one 86 delivers electrical power to a ballast one 94 on a switched power supply line 96, and the ballast one 94 provides power to the lamp one 102 on a ballasted power supply line 104.

The lamp circuit for lamp two 106 preferably includes a corresponding switch two 90 that receives electrical power from the power source 82 on a power supply line 92. The switch two 90 delivers electrical power to a ballast two 98 on a switched power supply line 100, and the ballast two 98 provides power to the lamp two 106 on a ballasted power supply line 108.

Each switch in a lamp circuit, such as switch one 86 and switch two 90, is preferably adapted to be placed into either an open condition (where the switch is an electrical open circuit through which no current flows) or in a closed condition (where the switch is an electrical closed circuit through which current can flow). To maximize efficiency, a mechanical relay switch, instead of a solid state switch, can be used so that essentially no trickle current passes through the switch when the switch is in an open condition.

The open or closed condition of each switch is preferably independently controllable by the controller 80. For example, the controller 80 can be connected to switch one 86 by a switch control line 110, whereby the controller can place switch one 86 into either a closed or an open condition. Similarly, the controller 80 can be connected to switch two 90 by a switch control line 112, whereby the controller can place switch two 90 into either a closed or an open condition.

Each ballast in a lamp circuit, such as ballast one 94 and ballast two 98, is preferably dimmable to allow the light output from its lamp to be adjusted by the controller 80. For example, the controller 80 can be connected to ballast one 94 by a ballast control line 114, so the controller can adjust the power output of ballast one 94 to adjust the light output from lamp one 102. Similarly, the controller 80 can be connected to ballast two 98 by a ballast control line 116, so the controller can adjust the power output of ballast two 98 to adjust the light output from lamp two 106.

The light fixture can include one or more sensors to provide information about the environment in which the light fixture operates. For example, the fixture can include an ambient light sensor 120 providing an ambient light signal to the controller 80 on an ambient light signal line 122. Using the ambient light signal, the controller 80 can adjust the light output from the fixture, for example to reduce the artificial light produced by the fixture on a sunny day when ambient light provides adequate illumination, or to increase the artificial light produced by the fixture on a cloudy day when ambient light is inadequate. The sensor can be mounted directly on the light fixture, or it can be mounted elsewhere, such as part of the incoming power cord. For example, in U.S. Pat. No. 6,746,274, the contents of which are incorporated herein by reference, teaches a motion detector built into a modular power cord.

The fixture can include a motion sensor 124 providing a motion signal to the controller 80 on an motion signal line 126. Using the motion signal, the controller 80 can turn on the fixture when the motion signal indicates the presence of motion near the fixture. Similarly, the controller 80 can turn off the fixture when the motion signal indicates the absence of any motion near the fixture.

The fixture can include a temperature sensor 128 providing a temperature signal to the controller 80 on an temperature signal line 130. The temperature signal can indicate, for example, the air temperature in the vicinity of the fixture. Alternatively, the temperature signal can indicate the temperature of the ballast or other components of the light fixture, so that any temperature rise resulting from abnormal operation or impending failure can be promptly detected to avoid ongoing inefficiency, the possibility of a fire, or a catastrophic failure of the ballast.

The fixture can include a proximity sensor 132 providing a proximity signal to the controller 80 on a proximity signal line 134. Using the proximity signal, the controller 80 can turn on the fixture on or off when the proximity signal indicates the presence or absence of a person or other object near the fixture.

The fixture can also include a communicator 136 to allow communication between the controller 80 and an external system (not shown). The communicator can be, for example, of the type commonly known as X-10. For example, the communicator 136 can be connected to the controller 80 for bidirectional communication on a communicator signal line 138. With bidirectional communication, the controller 80 can receive a command from an external system, for example to dim, turn on, or turn off a lamp, and the controller 80 can acknowledge back to the external system whether or not the command has been performed successfully. Similarly, the external system could request the current temperature of the ballast of the fixture, and the controller 80 could reply with that temperature.

However, bidirectional communication is not required and one-way communication could also be used. With one-way communication, the fixture could simply receive and execute commands from an external system without providing any confirmation back to the external system as to whether the command was executed successfully or not. Similarly, the fixture could periodically and automatically transmit its status information to an external system, without requiring any request from the external system for the status information.

The fixture can include a smoke detector 140 providing a smoke detector signal to the controller 80 on a smoke detector signal line 142. Using the smoke detector signal, the controller 80 can provide a local alarm, for example with a flashing light or a siren, whenever the smoke detector signal indicates the presence of a fire or smoke. Similarly, the controller 80 can provide the smoke detector signal to an external system, for example through the communicator 136, to a security office or fire department.

The fixture can include a camera and/or microphone 144 providing a camera/microphone signal to the controller 80 on a camera/microphone signal line 146. The controller 80 can provide the camera/microphone signal to an external system, for example through the communicator 136, to a security office, time-lapse recorder, or supervisory station.

The fixture can include an audio output device 148, for example a speaker. The controller 80 can drive the audio output device 148, for example with an audio signal on an audio signal line 150, to provide an alarm, paging, music, or public address message to persons in the vicinity of the fixture. The alarm, paging, music, or public address message can be received by the controller 80 via the communicator 136 from an external system, although this is not required and the alarm, paging, music, or public address message may be internally generated.

FIGS. 14-17 illustrate a light fixture 400 (e.g., a modular light fixture) according to another exemplary embodiment. The light fixture 400 may employ any suitable type of lighting elements, including light emitting diodes (LEDs) or other types of lighting elements, whether now known or developed in the future. For purposes of the following description, it will be assumed that the lighting elements illustrated in FIGS. 14-17 are LEDs, although it should be understood that other types of lighting elements may be used in place of the LEDs.

Light fixture 400 includes a fixture body 466 and a detachable power pack 464. The fixture body 466 can be generally said to include a pair of raceways 412 at either end thereof and one or more support structures 422 (each of which may alternatively be referred to as a support, carrier, panel, span, platform, reflector, heat sink, or the like) extending between the raceways 412. According to an exemplary embodiment, the support structures 422 may act as a light reflector and may have one or more surfaces that reflect light in a different direction as defined by the configuration of the support structure (e.g., the support structure may have a lower surface that includes a light-reflective characteristic, such as being a white painted surface, a mirrored surface, or any other surface intended and/or configured to reflect light therefrom). According to other exemplary embodiments, the support structures may include one or more surfaces (e.g., the lower surfaces) that have a light absorptive characteristic (e.g., they may have a black surface that absorbs light and acts to prevent light from being directed upward from the light fixture). According to an exemplary embodiment, the support structures 422 may also act as heat sinks for the lighting elements coupled thereto.

The support structures 422 may be coupled directly or indirectly to the raceways 412, using fasteners such as screws, bolts, adhesive, or any other suitable types of fastening mechanism. Each raceway 412 is enclosed with a raceway cover 416, so that the raceway 412 and raceway cover 416 together form a raceway channel (not shown, but having a similar configuration as described with respect to raceway channel 18 shown in FIGS. 2-3).

Figure 14:
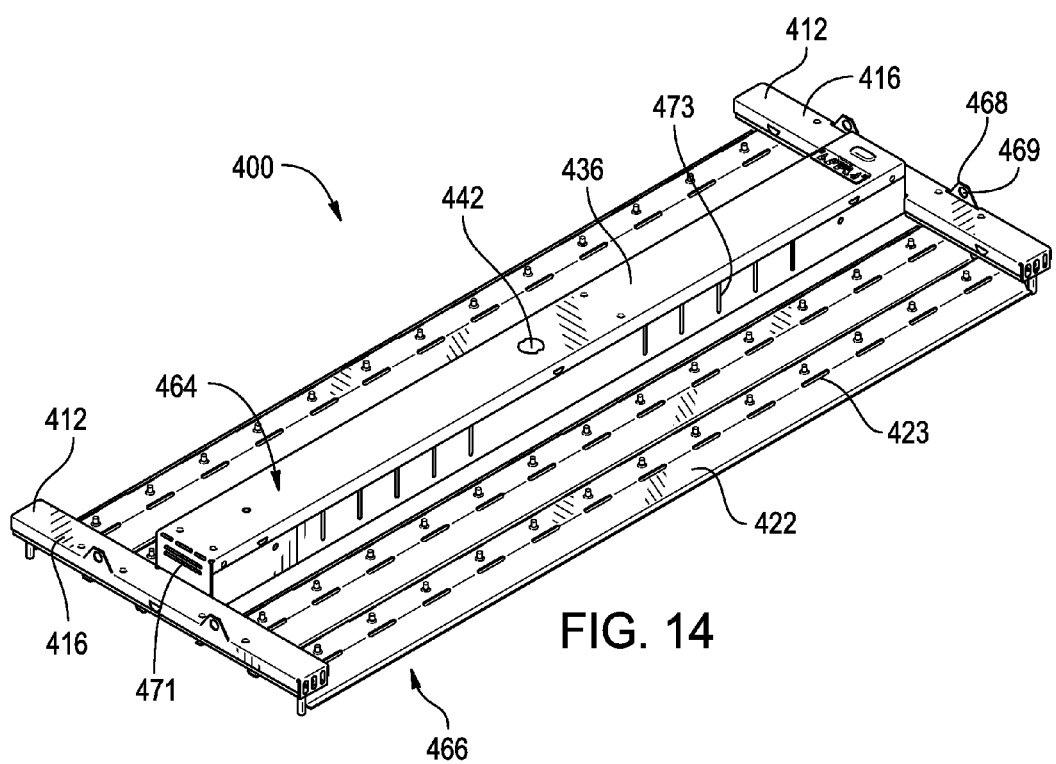
FIG. 14 is a perspective view of a light fixture according to another exemplary embodiment.
Figure 15:
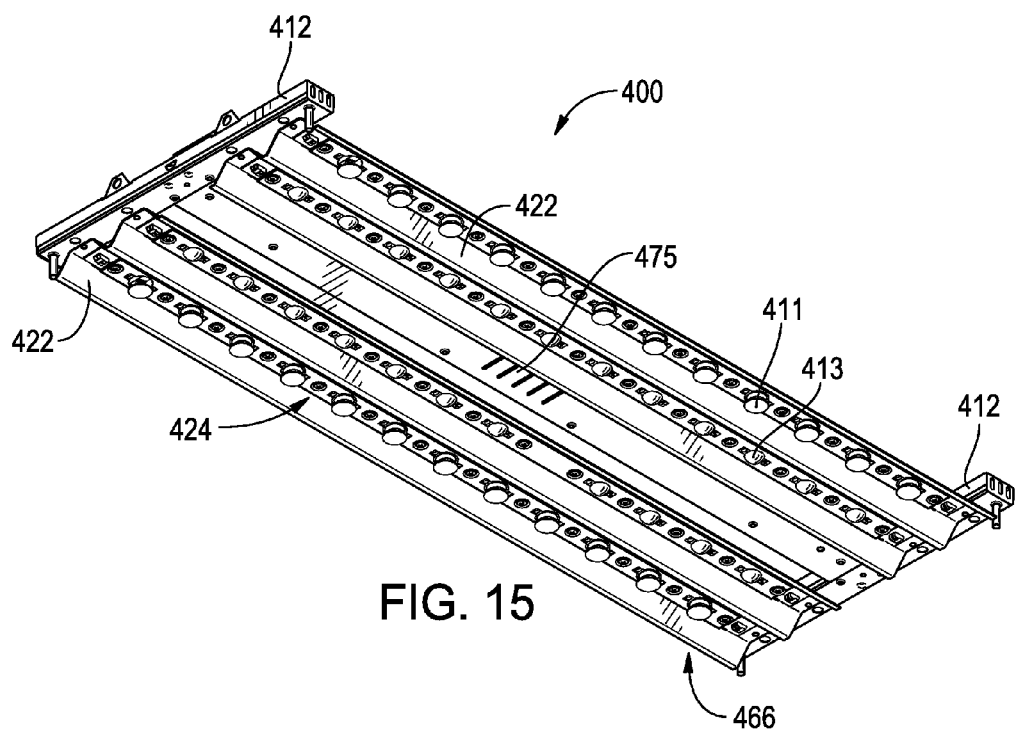
FIG. 15 is another perspective view of the light fixture shown in FIG. 14.

The raceways 412 include suspension points 468 for suspending the light fixture 410 above an area to be illuminated, for example using one or more chains connected between the suspension points and the ceiling. As illustrated in FIG. 14, the suspension points are provided as flanges or extensions that extend from the raceways and have an aperture 469 provided therethrough for receiving a cable, wire, or other hanging structure, and may be provided in any suitable location. According to other exemplary embodiments, suspension points such as shown as suspension points 68 in FIG. 1 may be used. One advantageous feature of suspension points 68 or 468 is that the suspension hardware does not interfere with maintenance of the light fixture, including but not limited to replacement of the detachable power pack 464.

The support structures 422 are secured to each of the raceways 412 such as by rivets, bolts, screws or the like. While FIGS. 14-17 illustrate a particular number of support structures, it should be noted that any number of support structures can be used according to other exemplary embodiments. Each support structure 422 can be fabricated from a single piece of material or can be fabricated of individual pieces of material. Each support structure 422 defines at least one reflector channel 424 in which various lighting elements may be positioned.

As mentioned above, the support structures 422 may act as heat sinks for the lighting elements coupled thereto, so as to direct heat away from the lighting elements. According to an exemplary embodiment, the support structures are formed from a conductive metal such as aluminum or other suitable material that are effective to draw heat away from the lighting elements. According to other exemplary embodiments, the support structures may have additional heat sink elements attached thereto that are configured to remove heat from the lighting elements.

According to an exemplary embodiment, the support structures also include openings or apertures 423 provided therein that are also configured to allow for additional heat removal from the light fixture. While such apertures are illustrated as being generally elongated slots, any of a variety of other configurations for the apertures may be used in addition to or in place of such slots.

As shown in FIGS. 14-17, the light fixture 410 utilizes a plurality of LEDs that are spaced along the length of the light fixture 410 in a linear fashion. Each LED has associated therewith a lens for directing light emitted from the LED. Such lenses may be removable from adjacent the LEDs and replaced with similar or different types of lenses having any of a variety of desired characteristics. Any suitable type of LED lens may be used with any of the LEDs. As illustrated, the light fixture utilizes LEDs having different associated lenses. For example, as shown, the light fixture 410 uses linear arrays of LEDs 411 having a first type of LED lens as well as linear arrays of LEDs 413 having a second type of LED lens. The differing types of lenses may provide different lighting characteristics for the LEDs (e.g., brightness, color, area of coverage, etc.). It should be noted that any of a variety of configurations are possible according to other exemplary embodiments. For example, instead of linear arrays of LEDs having all of one type of LED or LED lens (e.g., LEDs having all the same types of lenses, LEDs all being of the same color, etc.), the linear arrays may use one, two, three, or a different number of different types of LEDs and/or lenses. For example, each LED in a particular grouping or array may have a different type of associated lens, or subsets of the LEDs may have similar associated lenses. In another example, each array may include alternating LED lenses (e.g., the lenses associated with LEDs 411 and 413). The position of the LEDs may be reversed according to other exemplary embodiments—i.e., the LEDs 413 may be in the outermost linear arrays, while the LEDs 411 may be in the inner linear arrays. Further, while the LEDs are shown as being provided in linear arrays, according to other exemplary embodiments, the LEDs may be provided in different types of groupings where the LEDs are arranged differently.

Figure 16:
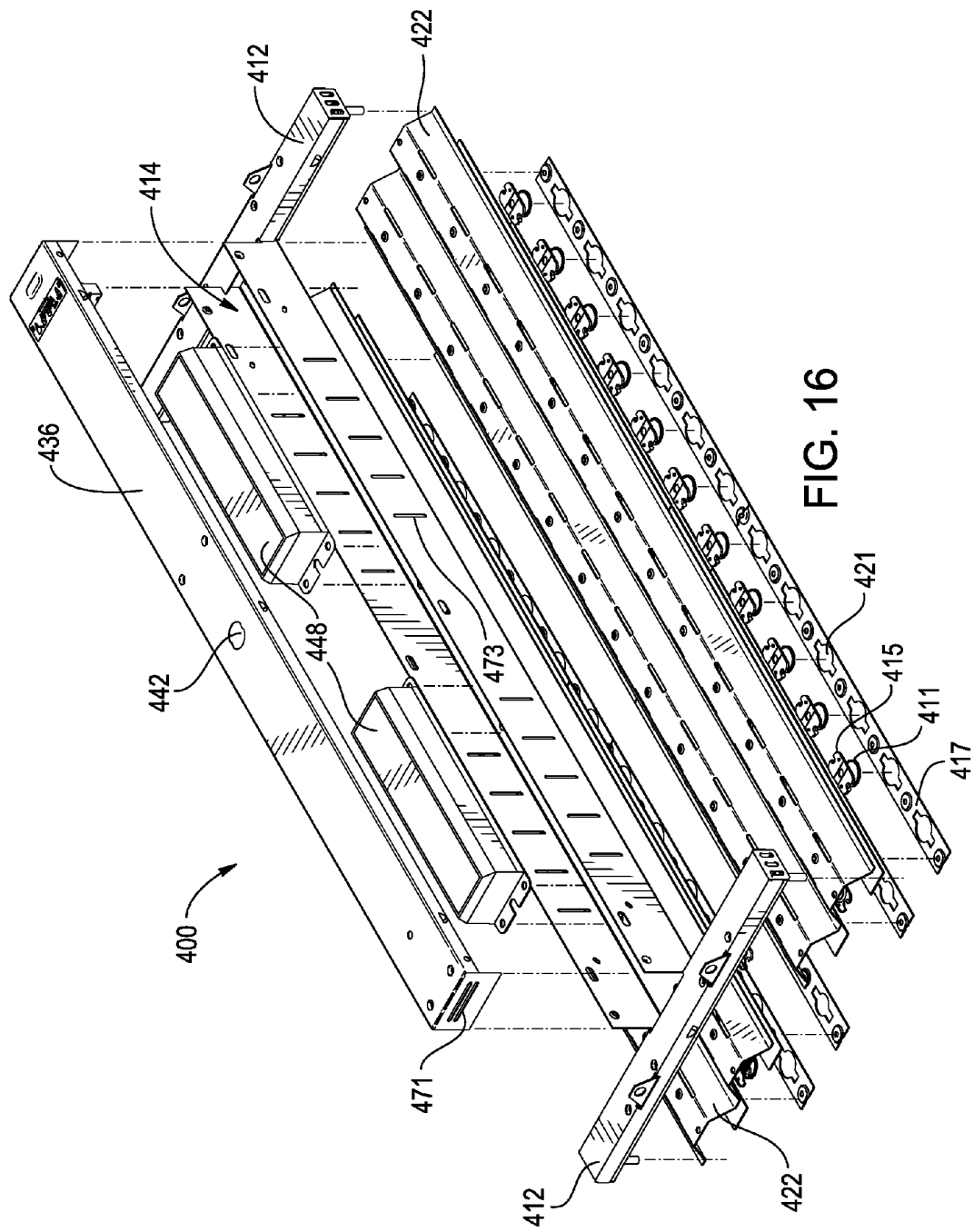
FIG. 16 is an exploded perspective view of the light fixture shown in FIG. 14.
Figure 17:
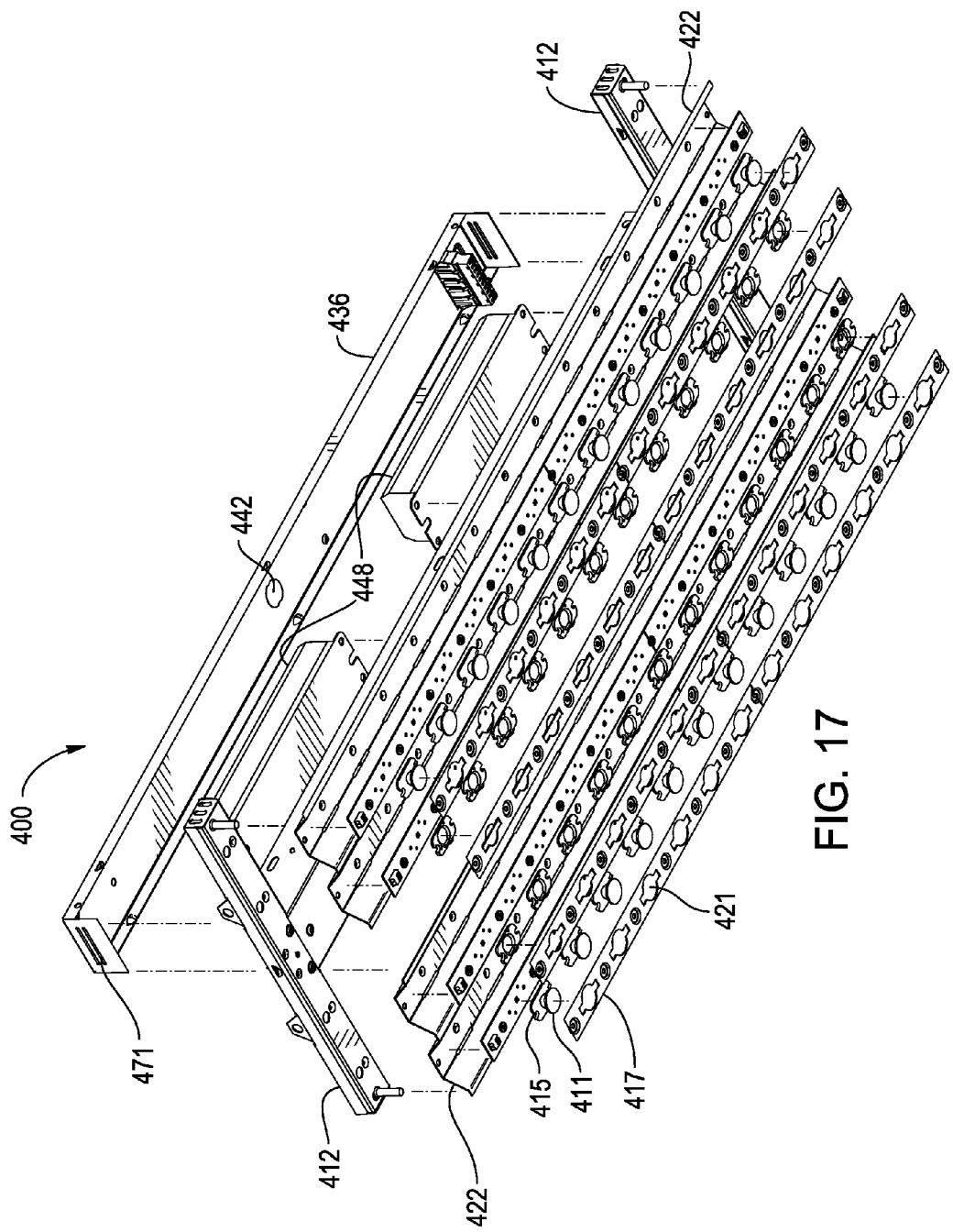
FIG. 17 is another exploded perspective view of the light fixture shown in FIG. 14.

Each of the LEDs includes a base 415, as shown, for example, in FIG. 16. These bases have a flanged configuration, although according to other exemplary embodiments, the base may have other configurations. According to one exemplary embodiment, the bases 415 may be secured directly to the light support structure 422 using fasteners such as screws, bolts, adhesive, or other suitable fastening mechanisms. According to another exemplary embodiment as illustrated in FIGS. 14-17, however, a member or element 417 in the form of an elongated strip of material (e.g., a metal), for example in the form of a rail, may be provided for simultaneously coupling a plurality of LEDs to the support structure. As shown in FIG. 16, the member 417 includes a plurality of apertures 421 that are configured to receive or be aligned with the LEDs and their associated lenses (according to one exemplary embodiment, the LED and/or its associated lens may extend through the apertures; according to other exemplary embodiments, one or both of the LED and the associated lens may be flush with or below the surface of the member 417). The apertures are not large enough for the bases 415 of the LEDs and their associated lenses to fit through, and so the member 417 acts to sandwich the bases 415 between the member 417 and the support structure 422 when the member 415 is coupled to the support structure 422. One advantageous feature of the use of such a member is that the LEDs may be coupled to the support structure 422 more quickly and using fewer fasteners than if the LEDs were each coupled individually. According to an exemplary embodiment, the member 415 may be formed of a metal such as aluminum; according to other exemplary embodiments, the member may be formed of any other suitable material.

The detachable power pack 464 of the light fixture 410 includes a cover 436 and one or more power supplies 448 (referred to in the following description as "drivers" since they are associated with LEDs in this embodiment, although it should be understood that other types of power supplied may be used according to other exemplary embodiments) provided in a channel 414 (e.g., a driver channel). The power pack 464 may also include similar features to those described above with respect to the power pack 64, including power input wiring (similar to power input wiring 54), a modular power input connector (similar to power input connector 56), output wiring (similar to output wiring 58), and a modular output connector (similar to modular output connector 60) (such features are not shown in FIGS. 14-17 so as not to obscure other features, but should be understood to perform in a similar manner to those features described with respect to power pack 64, with any necessary modifications when other types of power supplies are used in place of the ballasts described with respect to power pack 64).

The detachable power pack 464 may be detachable from the light fixture body 466 without the use of tools, and without any interference from the suspension hardware. It should be noted that the cover 436 may be coupled directly to the walls of the channel 414 and/or to the raceways 412, or may be coupled indirectly to either of such components. The cover 436 may be removably coupled using any suitable fastening mechanism, including clips, snaps, screws, bolts, or any other fastening mechanism that allows for relatively simple removal of the cover 436 to allow access to the channel 414 and the components provided therein (e.g., the drivers, wiring, etc.).

The cover 436 includes a power line connector aperture 442 adapted to receive a modular power input connector (such as modular power input connector 56). The modular power input connector may be a polarized modular power input socket configured for the available electrical power supply voltage and configuration, as discussed above with reference to FIGS. 9-10. However, this is not required, and other methods can be used to supply electrical power to the fixture, as discussed in more detail with reference to FIGS. 6(a)-6(c). The specifics of the various wiring and connectors may be the same as or slightly different to that described above, but operates similarly in principle. The power supplies (e.g., drivers) are operatively coupled to receive power from an external power source and to provide power to the lighting elements (e.g., LEDs) using any of a variety of wiring configurations such as those described in the present application, and the installation of the light fixture 410 may be similar to that described with respect to the other exemplary embodiments discussed herein.

The power pack 464 also includes a number of apertures or holes 471, 473, 475 that may act as vents to allow heat to escape from within the power pack. While shown as elongated slots, the apertures may have other shapes or configurations, and may be provided in different numbers or groupings, according to other exemplary embodiments. Also according to other exemplary embodiments, the cover 436 may include one or more apertures for a similar purpose, having any desired shape or configuration.

It should be understood that the invention(s) are not limited to the details of construction and the arrangement of components set forth in the following description or illustrated in the drawings. The concepts described herein are capable of other embodiments and of being practiced or of being carried out in various ways. Also, it is to be understood that the phraseology and terminology used herein is for the purpose of description and should not be regarded as limited.

The use of "including," "comprising," "supporting," or "having" and variations thereof herein is meant to encompass the items listed thereafter and equivalents thereof as well as additional items. The terms "mounted," "connected," "supported," and "coupled" are used broadly and encompass both direct and indirect mounting, connecting, supporting, and coupling. Further, "connected" and "coupled" are not restricted to physical or mechanical connections or couplings, and can include electrical connections or couplings, whether direct or indirect.

Furthermore, and as described in subsequent paragraphs, the specific mechanical configurations illustrated in the drawings are intended to exemplify embodiments of the invention and other alternative mechanical configurations are possible.

It is important to note that the construction and arrangement of the elements of the modular light fixture and other structures shown in the exemplary embodiments discussed herein are illustrative only. Those skilled in the art who review this disclosure will readily appreciate that many modifications are possible (e.g., variations in sizes, dimensions, structures, shapes and proportions of the various elements, values of parameters, mounting arrangements, materials, transparency, color, orientation, etc.) without materially departing from the novel teachings and advantages as described herein.

Further, while the exemplary application of the device is in the field of fluorescent and LED lighting, the invention(s) have a much wider applicability.

The particular materials used to construct the exemplary embodiments are also illustrative. For example, although the reflectors in the exemplary embodiment are made of aluminum, other materials having suitable properties could be used. All such modifications, to materials or otherwise, are intended to be included within the scope of the present invention(s) as defined in the appended claims.

The order or sequence of any process or method steps may be varied or re-sequenced according to alternative embodiments. Other substitutions, modifications, changes and/or omissions may be made in the design, operating conditions and arrangement of the various exemplary embodiments without departing from the spirit of the present invention(s) as expressed in the appended claims.

The components of the various exemplary embodiments may be mounted to each other in a variety of ways as known to those skilled in the art. As used in this disclosure and in the claims, the terms mount and attach include embed, glue, join, unite, connect, associate, hang, hold, affix, fasten, bind, paste, secure, bolt, screw, rivet, solder, weld, and other like terms. The term cover includes envelop, overlay, and other like terms.

It is understood that the invention(s) are not confined to the embodiments set forth herein as illustrative, but embraces all such forms thereof that come within the scope of the following claims.

What is claimed is:

1. A light fixture comprising:
    a support structure;
    a plurality of light emitting diodes (LEDs) coupled to the support structure and spaced apart along a length of the support structure between a first end and a second end of the light fixture;
    a power pack, wherein the power pack includes a driver configured to be electrically coupled to the plurality of LEDs, power input wiring configured to receive power for the light fixture, and a cover provided substantially over the driver and the power input wiring; and
    a modular power input connector accessible without removing the cover, wherein the modular power input connector is coupled to the power input wiring, and wherein the modular power input connector is configured to accept a power cord.

2. The light fixture of claim 1, wherein the cover is configured to be detachable from the power pack, and wherein the cover provides access to the driver and the power input wiring.

3. The light fixture of claim 1, wherein the modular power input connector is coupled to the cover.

4. The light fixture of claim 1, wherein the modular power input connector is accessible via an aperture of the cover.

5. The light fixture of claim 1, wherein the plurality of LEDs project light from a first side of the light fixture and the detachable cover is provided on a second side of the light fixture opposite the first side.

6. The light fixture of claim 1, wherein the plurality of LEDs are coupled to the support structure individually using a plurality of fasteners.

7. The light fixture of claim 1, wherein the power pack is configured to be detachable from the light fixture without using tools.

8. The light fixture of claim 1, wherein the modular power input connector comprises a socket portion and a plug portion, wherein one of the socket portion and the plug portion are coupled to power input wiring and the other of the socket portion and the plug portion are configured to be coupled to a power cord.

9. The light fixture of claim 1, further comprising a member coupled to the support structure that acts to couple a plurality of the plurality of LEDs to the support structure.

10. The light fixture of claim 9, wherein the member includes a plurality of apertures, and wherein each of the plurality of LEDs is aligned with one of the plurality of apertures.

11. The light fixture of claim 1, wherein the power pack comprises a driver channel configured to at least partially contain the driver and the power input wiring.

12. The light fixture of claim 11, wherein the cover is provided over the driver channel.

13. The light fixture of claim 1, wherein a first plurality of the LEDs coupled to the support structure have an associated first lens type and a second plurality of the LEDs coupled to the support structure have an associated second lens type that is different from the first lens type.

14. The light fixture of claim 13, wherein the first plurality of the LEDs and the second plurality of the LEDs are arranged in a grouping wherein the first plurality of LEDs form linear arrays running a length of the light fixture and the second plurality of LEDs form linear arrays running the length of the light fixture, and wherein the linear arrays are adjacent and alternate between the first plurality of LEDs and the second plurality of LEDs.

15. The light fixture of claim 13, wherein the plurality of LEDs are arranged in a plurality of linear arrays, and wherein each linear array includes alternating LEDs from the first plurality of LEDs and the second plurality of LEDs.

16. A method comprising:
    providing a preassembled light fixture, wherein the light fixture comprises a power pack, a cover provided over the power pack, and a power input connector coupled to the cover and configured to receive power from a power source and to direct power to the power pack, the power input connector configured to be coupled to the power source without removing the cover from the light fixture; and
    connecting the power input connector to a power supply line electrically coupled to the power source without removing the cover;
    wherein the light fixture comprises a plurality of light emitting diodes that receive power from the power pack, and wherein the power pack includes at least one driver for controlling the plurality of light emitting diodes.

17. The method of claim 16, wherein the power input connector comprises a socket portion and a plug portion, and the step of connecting the power input connector to a power supply line comprises connecting the power supply line to one of the socket portion or the plug portion.

18. The method of claim 16, further comprising disconnecting the power input connector from the power supply line without removing the cover.

19. The method of claim 16, further comprising removing the detachable cover and power input connector from the light fixture and decoupling the power pack from the light fixture.

20. The method of claim 16, wherein the cover is a detachable cover releasably coupled to the power pack.

* * * * *